(12) United States Patent
Ge et al.

(10) Patent No.: US 10,925,112 B2
(45) Date of Patent: Feb. 16, 2021

(54) METHOD FOR APPLYING FOR MEDIA TRANSMISSION PERMISSION, AND METHOD AND APPARATUS FOR CANCELING MEDIA TRANSMISSION PERMISSION

(71) Applicant: Huawei Technologies Co., Ltd., Shenzhen (CN)

(72) Inventors: Cuili Ge, Beijing (CN); Niranth Amogh, Bangalore (IN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/793,666

(22) Filed: Feb. 18, 2020

(65) Prior Publication Data

US 2020/0187294 A1 Jun. 11, 2020

Related U.S. Application Data

(63) Continuation of application No. 16/246,750, filed on Jan. 14, 2019, now Pat. No. 10,602,569, which is a
(Continued)

(51) Int. Cl.
*H04W 76/45* (2018.01)
*H04W 4/10* (2009.01)
(Continued)

(52) U.S. Cl.
CPC ......... *H04W 76/45* (2018.02); *H04L 65/4061* (2013.01); *H04W 4/08* (2013.01); *H04W 4/10* (2013.01)

(58) Field of Classification Search
CPC ......... H04W 76/45; H04W 4/08; H04W 4/10; H04L 65/4061
(Continued)

(56) References Cited

U.S. PATENT DOCUMENTS 5,369,783 A * 11/1994 Childress ............. H04W 84/08
455/17
5,862,329 A * 1/1999 Aras ..................... H04N 7/152
348/14.09
(Continued)

FOREIGN PATENT DOCUMENTS

CN 101005651 A 7/2007
CN 101027925 A 8/2007
(Continued)

OTHER PUBLICATIONS

3rd Generation Partnership Project; Technical Specification Group Services and System Aspects; Functional architecture and information flows to support mission critical communication services ;Stage 2 (Release 13), 3GPP TS 23.179 V13.2.0 (Jun. 2016), 228 pages.
(Continued)

*Primary Examiner* — Hai V Nguyen
(74) *Attorney, Agent, or Firm* — Slater Matsil, LLP

(57) ABSTRACT

A method for applying for media transmission permission, and a method and an apparatus for canceling media transmission permission are provided. The method for applying for media transmission permission includes: determining, by a first terminal, that a second terminal needs to transmit media data; and sending, by the first terminal, media transmission permission request indication information to a mission critical service (MCS) server, where the media transmission permission request indication information is used to instruct the MCS server to grant media transmission permission to the second terminal.

19 Claims, 14 Drawing Sheets

Related U.S. Application Data continuation of application No. PCT/CN2016/090205, filed on Jul. 15, 2016.

(51) Int. Cl.
    *H04L 29/06*     (2006.01)
    *H04W 4/08*     (2009.01)

(58) Field of Classification Search
    USPC .................................................. 455/518, 519
    See application file for complete search history.

(56) References Cited

U.S. PATENT DOCUMENTS

| | | | | |
|---|---|---|---|---|
| 5,867,653 | A * | 2/1999 | Aras | G09B 5/14 348/E7.084 |
| 7,493,651 | B2 * | 2/2009 | Vanska | H04L 63/126 726/2 |
| 7,570,756 | B2 * | 8/2009 | Park | H04L 29/06027 370/331 |
| 7,688,764 | B2 * | 3/2010 | Dorenbosch | H04L 65/4038 370/260 |
| 7,693,533 | B2 * | 4/2010 | Sung | H04W 76/45 455/518 |
| 7,929,012 | B2 * | 4/2011 | Fry | H04L 29/06027 348/14.09 |
| 7,933,621 | B1 * | 4/2011 | Vu | H04W 8/186 455/518 |
| 8,059,793 | B2 * | 11/2011 | Shaffer | H04L 51/36 379/88.13 |
| 8,285,316 | B2 * | 10/2012 | Coulombe | H04L 65/605 455/518 |
| 8,325,615 | B2 * | 12/2012 | Agarwal | H04L 47/2416 370/252 |
| 8,385,937 | B2 * | 2/2013 | Vakil | H04W 16/04 455/453 |
| 8,553,631 | B2 * | 10/2013 | Oprescu-Surcobe | H04W 4/12 370/329 |
| 8,583,158 | B2 * | 11/2013 | Lee | H04L 65/4061 455/519 |
| 8,908,699 | B2 * | 12/2014 | Karaoguz | H04L 65/80 370/401 |
| 9,083,772 | B2 * | 7/2015 | Lin | H04L 67/14 |
| 9,100,459 | B2 * | 8/2015 | Lin | H04L 12/66 |
| 9,154,503 | B2 * | 10/2015 | Zhang | H04L 63/10 |
| 9,173,073 | B2 * | 10/2015 | Marocchi | H04L 47/20 |
| 9,196,101 | B2 * | 11/2015 | Myllymaki | G06F 21/88 |
| 9,241,049 | B2 * | 1/2016 | Darcie | H04L 65/80 |
| 9,307,372 | B2 * | 4/2016 | Karaoguz | H04L 65/1023 |
| 9,443,421 | B2 * | 9/2016 | Yamaguchi | G06F 21/12 |
| 9,485,206 | B2 * | 11/2016 | Day, II | H04W 4/029 |
| 9,510,166 | B1 * | 11/2016 | Allen | H04W 76/45 |
| 9,628,965 | B2 * | 4/2017 | Allen | H04W 4/10 |
| 9,680,924 | B2 * | 6/2017 | Kodaypak | H04W 4/06 |
| 9,928,379 | B1 * | 3/2018 | Hoffer | G16H 50/70 |
| 9,949,095 | B2 * | 4/2018 | Dong | H04W 4/10 |
| 10,051,440 | B2 * | 8/2018 | Åkesson | H04L 65/1069 |
| 10,079,822 | B2 * | 9/2018 | Stojanovski | H04W 60/04 |
| 10,110,669 | B2 * | 10/2018 | Kodaypak | H04L 12/66 |
| 10,123,182 | B2 * | 11/2018 | Allen | H04L 65/4061 |
| 10,129,712 | B2 * | 11/2018 | Dong | H04L 65/4069 |
| 10,142,808 | B2 * | 11/2018 | Dong | H04W 76/45 |
| 10,225,226 | B2 * | 3/2019 | Ko | H04L 51/26 |
| 10,264,623 | B2 * | 4/2019 | Lee | H04W 4/029 |
| 10,271,370 | B2 * | 4/2019 | Atarius | G01S 17/10 |
| 10,313,844 | B2 * | 6/2019 | Gupta | G06F 3/0484 |
| 10,382,904 | B2 * | 8/2019 | Lee | H04W 76/45 |
| 10,505,995 | B2 * | 12/2019 | Atarius | H04W 4/023 |
| 10,602,569 | B2 * | 3/2020 | Ge | H04W 4/10 |
| 2002/0082927 | A1 * | 6/2002 | Borenstein | G06Q 20/20 705/21 |
| 2003/0152040 | A1 | 8/2003 | Crockett et al. | |
| 2005/0021785 | A1 * | 1/2005 | Nakaji | H04L 12/12 709/229 |
| 2005/0198097 | A1 * | 9/2005 | Kalnitsky | H04L 65/4069 709/200 |
| 2006/0009232 | A1 * | 1/2006 | Vakil | H04W 16/04 455/453 |
| 2006/0035656 | A1 * | 2/2006 | Sung | H04L 65/4007 455/518 |
| 2006/0126648 | A1 | 6/2006 | Park et al. | |
| 2006/0177005 | A1 * | 8/2006 | Shaffer | H04L 51/36 379/67.1 |
| 2006/0223563 | A1 * | 10/2006 | Sung | H04W 76/45 455/518 |
| 2007/0019595 | A1 * | 1/2007 | Huh | H04L 12/189 370/338 |
| 2007/0202854 | A1 * | 8/2007 | Park | H04W 72/1289 455/414.1 |
| 2007/0223677 | A1 | 9/2007 | Ono | |
| 2007/0254642 | A1 * | 11/2007 | Suotula | H04W 76/45 455/422.1 |
| 2008/0076361 | A1 * | 3/2008 | Park | H04W 76/45 455/90.2 |
| 2008/0098063 | A1 | 4/2008 | Huh et al. | |
| 2008/0159177 | A1 * | 7/2008 | Balachandran | H04W 72/005 370/260 |
| 2008/0201407 | A1 * | 8/2008 | Fodor | H04W 76/45 709/203 |
| 2008/0248762 | A1 * | 10/2008 | Lee | H04L 65/4061 455/90.2 |
| 2009/0124237 | A1 * | 5/2009 | Minami | H04M 3/38 455/412.1 |
| 2009/0197625 | A1 * | 8/2009 | Zhang | H04W 72/005 455/518 |
| 2009/0245256 | A1 | 10/2009 | Yan et al. | |
| 2009/0287828 | A1 * | 11/2009 | Wei | H04L 65/1083 709/227 |
| 2010/0234057 | A1 * | 9/2010 | Drozt | H04W 76/45 455/518 |
| 2011/0131665 | A1 * | 6/2011 | Ueda | G11B 20/00427 726/29 |
| 2012/0082098 | A1 * | 4/2012 | Oprescu-Surcobe | H04W 72/0406 370/329 |
| 2012/0089418 | A1 * | 4/2012 | Kamath | G16H 10/20 705/3 |
| 2012/0226708 | A1 * | 9/2012 | Srinivasa | H04L 65/602 707/769 |
| 2012/0278446 | A1 * | 11/2012 | Darcie | H04L 65/80 709/219 |
| 2013/0159521 | A1 * | 6/2013 | Marocchi | H04W 4/08 709/225 |
| 2014/0112244 | A1 * | 4/2014 | Lindner | H04L 65/4061 370/328 |
| 2014/0228011 | A1 * | 8/2014 | Goel | H04L 65/4061 455/416 |
| 2014/0378149 | A1 * | 12/2014 | Lau | H04L 65/1016 455/450 |
| 2015/0319585 | A1 | 11/2015 | Raj | |
| 2016/0128060 | A1 * | 5/2016 | Azarian Yazdi | H04L 1/1812 370/336 |
| 2016/0344726 | A1 * | 11/2016 | Stojanovski | H04L 9/3247 |
| 2016/0381526 | A1 * | 12/2016 | Allen | H04L 67/42 709/203 |
| 2016/0381528 | A1 * | 12/2016 | Lee | H04W 76/45 455/404.1 |
| 2017/0070868 | A1 * | 3/2017 | Allen | H04W 4/10 |
| 2017/0078371 | A1 * | 3/2017 | Kodaypak | H04W 4/06 |
| 2017/0094457 | A1 * | 3/2017 | Lee | H04W 4/10 |
| 2017/0142756 | A1 * | 5/2017 | Lee | H04W 4/029 |
| 2017/0188205 | A1 * | 6/2017 | Ventura Jaume | H04L 65/4038 |
| 2017/0237808 | A1 * | 8/2017 | Kodaypak | H04L 65/4084 709/203 |
| 2017/0238359 | A1 * | 8/2017 | Atarius | G01S 7/4817 370/259 |
| 2017/0245149 | A1 * | 8/2017 | Yang | H04W 8/005 |
| 2017/0251029 | A1 * | 8/2017 | Atarius | H04L 65/4061 |
| 2017/0257876 | A1 * | 9/2017 | Loehr | H04W 72/10 |
| 2017/0289776 | A1 * | 10/2017 | Kim | H04W 76/45 |

(56) References Cited

U.S. PATENT DOCUMENTS

| | | | | |
|---|---|---|---|---|
| 2017/0303100 A1* | 10/2017 | Dong | ................. | H04L 65/4061 |
| 2017/0303102 A1* | 10/2017 | Dong | ...................... | H04W 4/10 |
| 2017/0359186 A1* | 12/2017 | Atarius | ................... | H04W 4/24 |
| 2017/0374109 A1* | 12/2017 | Atarius | .............. | H04L 65/1016 |
| 2018/0020336 A1* | 1/2018 | Gupta | ..................... | H04W 4/10 |
| 2018/0077208 A1* | 3/2018 | Li | ............................. | H04W 4/10 |
| 2018/0242120 A1* | 8/2018 | Baek | ..................... | H04W 12/08 |
| 2018/0367604 A1* | 12/2018 | Kodaypak | ........... | H04L 65/4084 |
| 2019/0014448 A1* | 1/2019 | Baek | ........................ | H04W 4/08 |
| 2019/0241179 A1* | 8/2019 | Atarius | ................. | G01S 7/4876 |
| 2019/0273773 A1* | 9/2019 | Pattan | ..................... | H04L 69/14 |
| 2019/0289437 A1* | 9/2019 | Gupta | ................. | H04L 65/4038 |

FOREIGN PATENT DOCUMENTS

| | | |
|---|---|---|
| CN | 101232413 A | 7/2008 |
| CN | 101316396 A | 12/2008 |
| CN | 103220630 A | 7/2013 |
| EP | 1622406 B1 | 1/2008 |
| EP | 2129044 A1 | 12/2009 |
| JP | 2006042357 A | 2/2006 |
| JP | 2008011170 A | 1/2008 |
| KR | 100761805 A | 10/2006 |
| KR | 100642559 B1 | 11/2006 |
| KR | 20110066034 | 6/2011 |
| KR | 20120077460 A | 7/2012 |
| RU | 2316911 C2 | 2/2008 |
| RU | 2417554 C1 | 4/2011 |
| RU | 2469501 C2 | 12/2012 |
| WO | 2007068187 A1 | 6/2007 |
| WO | 2016106593 A1 | 7/2016 |

OTHER PUBLICATIONS

3rd Generation Partnership Project; Technical Specification Group Services and System Aspects; Functional architecture and information flows to support Mission Critical Push to Talk (MCPTT); Stage 2 (Release 14), 3GPP TS 23.379 V0.2.0 (Jun. 2016), 171 pages.

3rd Generation Partnership Project; Technical Specification Group Services and System Aspects; Functional architecture and information flows for mission critical video; Stage 2 (Release 14), 3GPP TS 23.VID V0.1.0 (Jun. 2016), 11 pages.

Huawei et al., "Pseudo-CR on Remotely initiated ambient listening call," 3GPP TSG-SA WG6 Meeting #11, S6-160435 (revision of S6-151388), Bangalore, India, Apr. 23-27, 2016, 5 pages.

Huawei et al., "Pseudo-CR on Remotely initiated ambient listening call," 3GPP TSG-SA WG6 Meeting #11, S6-160746 (revision of S6-160534), Bangalore, India, Apr. 23-27, 2016, 6 pages.

Samsung, "Off-Network MCPTT Evaluation and Conclusion Proposal," 3GPP TSG-SA WG6 Meeting #4, S6-150344, Fukuoka, Japan, May 24-29, 2015, 8 pages.

Samsung et al., "Off-Network MCPTT Evaluation and Conclusion Proposal," 3GPP TSG-SA WG6 Meeting #4, S6-150456 (revision of S6-150421), Fukuoka, Japan, May 24-29, 2015, 8 pages.

* cited by examiner

METHOD FOR APPLYING FOR MEDIA TRANSMISSION PERMISSION, AND METHOD AND APPARATUS FOR CANCELING MEDIA TRANSMISSION PERMISSION

CROSS-REFERENCE TO RELATED APPLICATIONS

This application is a continuation of U.S. patent application Ser. No. 16/246,750, filed on Jan. 14, 2019, which is a continuation of International Application No. PCT/CN2016/090205, filed on Jul. 15, 2016. All of the afore-mentioned patent applications are hereby incorporated by reference in their entireties.

TECHNICAL FIELD

This application relates to the field of mobile communications technologies, and in particular, to a method for applying for media transmission permission, and a method and an apparatus for canceling media transmission permission.

BACKGROUND

Mission-critical push-to-talk (MCPTT) supports one-to-many group communication and one-to-one private communication. In the MCPTT, when a terminal needs to transmit media data to another terminal, the terminal first needs to establish a call session (a group call session or a private call session) by using an MCPTT server. After the call session is established, the terminal that needs to transmit the media data needs to apply to the MCPTT server for media transmission permission, and transmit the media data after obtaining the media transmission permission. In this period, another terminal that obtains no floor cannot transmit media data, and can apply for the media transmission permission for media data transmission only when the media transmission permission is idle again. When a preemption manner is supported, if a floor control policy permits, a preempting terminal and a preempted terminal may simultaneously transmit media data.

Currently, in the MCPTT, there is only the foregoing one procedure for applying for the media transmission permission, and this solution is relatively simplistic. In an emergency, the terminal may be unable to apply for the media transmission permission for the terminal. In this case, the terminal cannot transmit the media data. Currently, there is no better solution for this case.

SUMMARY

Embodiments of this application provide a method for applying for media transmission permission, and a method and an apparatus for canceling media transmission permission, to provide a solution for applying for media transmission permission and canceling media transmission permission.

An embodiment of this application provides a method for applying for media transmission permission. The method includes determining, by a first terminal, that a second terminal needs to transmit media data. The method also includes sending, by the first terminal, media transmission permission request indication information to a mission critical service (MCS) server, where the media transmission permission request indication information is used to instruct the MCS server to grant media transmission permission to the second terminal.

According to the method provided in this embodiment of this application, after determining that the second terminal needs to transmit the media data, the first terminal sends the media transmission permission request indication information to the MCS server, to instruct the MCS server to grant the media transmission permission to the second terminal. Therefore, the first terminal can be used to apply for the media transmission permission for the second terminal when the second terminal cannot apply for the media transmission permission for the second terminal, so that the second terminal can transmit the media data.

Optionally, the media transmission permission request indication information is located in a first call request message.

The first call request message is used to instruct the MCS server to establish a first call session between the first terminal and the second terminal.

Optionally, after the sending, by the first terminal, media transmission permission request indication information to a mission critical service (MCS) server, the method further includes: receiving, by the first terminal, a first call response message that is sent by the MCS server and that includes a transmission taken message.

The transmission taken message is used to indicate that the media transmission permission is granted to the second terminal, and the first call response message is sent by the MCS server after the MCS server sends a second call request message to the second terminal based on the first call request message and receives a second call response message returned by the second terminal.

Optionally, after the sending, by the first terminal, media transmission permission request indication information to a mission critical service (MCS) server, the method further includes: receiving, by the first terminal, a transmission taken message sent by a transmission control server, where the transmission taken message is used to indicate that the media transmission permission is granted to the second terminal.

The transmission taken message is sent by the transmission control server after the transmission control server receives a media transmission permission request message sent by the MCS server based on the media transmission permission request indication information, and the media transmission permission request message is used to apply to the transmission control server for the media transmission permission for the second terminal.

Optionally, the media transmission permission request indication information is located in a remote private call request message.

The remote private call request message is used to instruct the MCS server to establish a second call session between the second terminal and a third terminal.

An embodiment of this application provides a method for applying for media transmission permission. The method includes receiving, by a mission critical service (MCS) server, media transmission permission request indication information sent by a first terminal, where the media transmission permission request indication information is used to instruct the MCS server to grant media transmission permission to a second terminal. The method also includes granting, by the MCS server, the media transmission permission to the second terminal according to the media transmission permission request indication information.

Optionally, before the granting, by the MCS server, the media transmission permission to the second terminal according to the media transmission permission request indication information, the method further includes: determining, by the MCS server, that the first terminal has permission to apply for media transmission permission for terminals except the first terminal, and that the second terminal allows terminals except the second terminal to apply for the media transmission permission for the second terminal.

Optionally, the media transmission permission request indication information is located in a first call request message.

The first call request message is used to instruct the MCS server to establish a first call session between the first terminal and the second terminal.

Optionally, the granting, by the MCS server, the media transmission permission to the second terminal according to the media transmission permission request indication information includes: establishing, by the MCS server, the first call session according to the first call request message; and after the first call session is established, granting, by using a transmission control server, the media transmission permission to the second terminal according to the media transmission permission request indication information.

Optionally, the granting, by the MCS server, the media transmission permission to the second terminal according to the media transmission permission request indication information includes: generating, by the MCS server based on the media transmission permission request indication information, a second call request message including a transmission granted message, where the transmission granted message is used to indicate that the second terminal obtains the media transmission permission, and the second call request message is used to invite the second terminal to participate in the first call session; and sending, by the MCS server, the second call request message to the second terminal.

Optionally, after the MCS server grants the media transmission permission to the second terminal by sending the second call request message to the second terminal, the method further includes: sending, by the MCS server, a first call response message including a transmission taken message to the first terminal, where the first call response message is sent by the MCS server after the MCS server receives a second call response message returned by the second terminal.

The transmission taken message is used to indicate that the media transmission permission is granted to the second terminal.

Optionally, the first call session is a group call session.

The media transmission permission request message is further used to instruct the transmission control server to send a transmission taken message to a third terminal in the group call session, where the transmission taken message is used to indicate that the media transmission permission is granted to the second terminal.

Optionally, the first call session is a group call session, and the method further includes: sending, by the MCS server, a third call request message to a third terminal based on the first call request message, where the third call request message is used to invite the third terminal to participate in the group call session; and sending, by the MCS server, a notification message including a transmission taken message to the third terminal, where the notification message is sent by the MCS server after the MCS server receives a third call response message returned by the third terminal.

Optionally, the media transmission permission request indication information is located in a remote private call request message.

The remote private call request message is used to instruct the MCS server to establish a second call session between the second terminal and a third terminal.

An embodiment of this application provides a method for applying for media transmission permission, and the method includes: after a call session between a first terminal and a second terminal is established, determining, by the first terminal, that the second terminal needs to transmit media data; and sending, by the first terminal, a remote transmission request message to a target server, where the remote transmission request message is used to instruct the target server to grant media transmission permission to the second terminal, and the target server is a mission critical service (MCS) server or a transmission control server.

Optionally, after the sending, by the first terminal, a remote transmission request message to a target server, the method further includes: receiving, by the first terminal, a transmission taken message sent by the target server.

The transmission taken message is used to indicate that the media transmission permission is granted to the second terminal.

An embodiment of this application provides a method for applying for media transmission permission. The method includes receiving, by a target server, a remote transmission request message sent by a first terminal, where the remote transmission request message is used to instruct the target server to grant media transmission permission to a second terminal, the remote transmission request message is sent after a call session between the first terminal and the second terminal is established, and the target server is a mission critical service (MCS) server or a transmission control server. The method also includes granting, by the target server, the media transmission permission to the second terminal.

Optionally, before the granting, by the target server, the media transmission permission to the second terminal, the method further includes: determining, by the target server, that the first terminal has permission to apply for media transmission permission for terminals except the first terminal, and that the second terminal allows terminals except the second terminal to apply for the media transmission permission for the second terminal.

Optionally, before the granting, by the target server, the media transmission permission to the second terminal, the method further includes: if the target server determines that a third terminal is taking the media transmission permission, canceling, by the target server, the media transmission permission taken by the third terminal.

An embodiment of this application provides a method for canceling media transmission permission. The method includes determining, by a first terminal, that a second terminal is taking media transmission permission to transmit media data. The method also includes sending, by the first terminal, a remote transmission release message to a target server, where the remote transmission release message is used to instruct the target server to cancel the media transmission permission of the second terminal, and the target server is a mission critical service (MCS) server or a transmission control server.

According to the method provided in this embodiment of this application, after the first terminal determines that the second terminal is taking the media transmission permission, the first terminal sends the remote transmission release message to the target server, to instruct the target server to cancel the media transmission permission of the second terminal. Therefore, the first terminal can be used to cancel the media transmission permission of the second terminal when the second terminal cannot cancel the media transmission permission of the second terminal, so that system efficiency is improved.

Optionally, after the sending, by the first terminal, a remote transmission release message to a target server, the method further includes: receiving, by the first terminal, a remote transmission idle message returned by the target server, where the remote transmission idle message is used to indicate that the media transmission permission of the second terminal is canceled.

An embodiment of this application provides a method for canceling media transmission permission. The method includes receiving, by a target server, a remote transmission release message sent by a first terminal, where the remote transmission release message is used to instruct the target server to cancel media transmission permission of a second terminal, and the target server is a mission critical service (MCS) server or a transmission control server. The method also includes canceling, by the target server, the media transmission permission of the second terminal according to the remote transmission release message.

Optionally, before the canceling, by the target server, the media transmission permission of the second terminal, the method further includes: determining, by the target server, that the first terminal has permission to cancel media transmission permission of terminals except the first terminal, and that the second terminal allows terminals except the second terminal to cancel the media transmission permission of the second terminal.

Optionally, after the canceling, by the target server, the media transmission permission of the second terminal, the method further includes: sending, by the target server, a remote transmission idle message to the first terminal, where the remote transmission idle message is used to indicate that the media transmission permission of the second terminal is canceled.

Optionally, a call session in which the second terminal is located is a group call session.

After the canceling, by the target server, the media transmission permission of the second terminal, the method further includes: sending, by the target server, a remote transmission idle message to a third terminal, where the remote transmission idle message is used to indicate that the media transmission permission of the second terminal is canceled, and the third terminal is any terminal in the group call session.

An embodiment of this application provides an apparatus for applying for media transmission permission. The apparatus includes: a processing unit, configured to determine that a second terminal needs to transmit media data; and a transceiver unit, configured to send media transmission permission request indication information to a mission critical service (MCS) server, where the media transmission permission request indication information is used to instruct the MCS server to grant media transmission permission to the second terminal.

Optionally, the media transmission permission request indication information is located in a first call request message.

The first call request message is used to instruct the MCS server to establish a first call session between the apparatus and the second terminal.

Optionally, after sending the media transmission permission request indication information to the mission critical service (MCS) server, the transceiver unit is further configured to receive a first call response message that is sent by the MCS server and that includes a transmission taken message.

The transmission taken message is used to indicate that the media transmission permission is granted to the second terminal, and the first call response message is sent by the MCS server after the MCS server sends a second call request message to the second terminal based on the first call request message and receives a second call response message returned by the second terminal.

Optionally, after sending the media transmission permission request indication information to the mission critical service (MCS) server, the transceiver unit is further configured to receive a transmission taken message sent by a transmission control server, where the transmission taken message is used to indicate that the media transmission permission is granted to the second terminal.

The transmission taken message is sent by the transmission control server after the transmission control server receives a media transmission permission request message sent by the MCS server based on the media transmission permission request indication information, and the media transmission permission request message is used to apply to the transmission control server for the media transmission permission for the second terminal.

Optionally, the media transmission permission request indication information is located in a remote private call request message.

The remote private call request message is used to instruct the MCS server to establish a second call session between the second terminal and a third terminal.

An embodiment of this application provides an apparatus for applying for media transmission permission. The apparatus includes a transceiver unit, configured to receive media transmission permission request indication information sent by a first terminal, where the media transmission permission request indication information is used to instruct the apparatus to grant media transmission permission to a second terminal. The apparatus also includes a processing unit, configured to grant the media transmission permission to the second terminal according to the media transmission permission request indication information.

Optionally, before granting the media transmission permission to the second terminal according to the media transmission permission request indication information, the processing unit is further configured to determine that the first terminal has permission to apply for media transmission permission for terminals except the first terminal, and that the second terminal allows terminals except the second terminal to apply for the media transmission permission for the second terminal.

Optionally, the media transmission permission request indication information is located in a first call request message.

The first call request message is used to instruct the apparatus to establish a first call session between the first terminal and the second terminal.

Optionally, the processing unit is configured to establish the first call session according to the first call request message; and after the first call session is established, grant, by using a transmission control server, the media transmission permission to the second terminal according to the media transmission permission request indication information.

Optionally, the processing unit is configured to generate, based on the media transmission permission request indication information, a second call request message including a transmission granted message, where the transmission granted message is used to indicate that the second terminal obtains the media transmission permission, and the second call request message is used to invite the second terminal to participate in the first call session; and send the second call request message to the second terminal by using the transceiver unit.

Optionally, after the media transmission permission is granted to the second terminal by sending the second call request message to the second terminal, the transceiver unit is further configured to send a first call response message including a transmission taken message to the first terminal, where the first call response message is sent by the apparatus after the apparatus receives a second call response message returned by the second terminal.

The transmission taken message is used to indicate that the media transmission permission is granted to the second terminal.

Optionally, the first call session is a group call session.

The media transmission permission request message is further used to instruct the transmission control server to send a transmission taken message to a third terminal in the group call session, where the transmission taken message is used to indicate that the media transmission permission is granted to the second terminal.

Optionally, the first call session is a group call session, and the transceiver unit is further configured to send a third call request message to a third terminal based on the first call request message, where the third call request message is used to invite the third terminal to participate in the group call session; and send a notification message including a transmission taken message to the third terminal, where the notification message is sent by the apparatus after the apparatus receives a third call response message returned by the third terminal.

Optionally, the media transmission permission request indication information is located in a remote private call request message.

The remote private call request message is used to instruct the apparatus to establish a second call session between the second terminal and a third terminal.

An embodiment of this application provides an apparatus for applying for media transmission permission. The apparatus includes a processing unit, configured to: after a call session between the apparatus and a second terminal is established, determine that the second terminal needs to transmit media data. The apparatus also includes a transceiver unit, configured to send a remote transmission request message to a target server, where the remote transmission request message is used to instruct the target server to grant media transmission permission to the second terminal, and the target server is a mission critical service (MCS) server or a transmission control server.

Optionally, after sending the remote transmission request message to the target server, the transceiver unit is further configured to receive a transmission taken message sent by the target server.

The transmission taken message is used to indicate that the media transmission permission is granted to the second terminal.

An embodiment of this application provides an apparatus for applying for media transmission permission. The apparatus includes a transceiver unit, configured to receive a remote transmission request message sent by a first terminal, where the remote transmission request message is used to instruct the target server to grant media transmission permission to a second terminal, the remote transmission request message is sent after a call session between the first terminal and the second terminal is established, and the target server is a mission critical service (MCS) server or a transmission control server. The apparatus also includes a processing unit, configured to grant the media transmission permission to the second terminal.

Optionally, before granting the media transmission permission to the second terminal, the processing unit is further configured to determine that the first terminal has permission to apply for media transmission permission for terminals except the first terminal, and that the second terminal allows terminals except the second terminal to apply for the media transmission permission for the second terminal.

Optionally, before granting the media transmission permission to the second terminal, the processing unit is further configured to if it is determined that a third terminal is taking the media transmission permission, cancel the media transmission permission taken by the third terminal.

An embodiment of this application provides an apparatus for canceling media transmission permission. The apparatus includes a processing unit, configured to determine that a second terminal is taking media transmission permission to transmit media data. The apparatus also includes a transceiver unit, configured to send a remote transmission release message to a target server, where the remote transmission release message is used to instruct the target server to cancel the media transmission permission of the second terminal, and the target server is a mission critical service (MCS) server or a transmission control server.

Optionally, after sending the remote transmission release message to the target server, the transceiver unit is further configured to receive a remote transmission idle message returned by the target server, where the remote transmission idle message is used to indicate that the media transmission permission of the second terminal is canceled.

An embodiment of this application provides an apparatus for canceling media transmission permission. The apparatus includes a transceiver unit, configured to receive a remote transmission release message sent by a first terminal, where the remote transmission release message is used to instruct the target server to cancel media transmission permission of a second terminal, and the target server is a mission critical service (MCS) server or a transmission control server. The apparatus also includes a processing unit, configured to cancel the media transmission permission of the second terminal according to the remote transmission release message.

Optionally, before canceling the media transmission permission of the second terminal, the processing unit is further configured to determine that the first terminal has permission to cancel media transmission permission of terminals except the first terminal, and that the second terminal allows terminals except the second terminal to cancel the media transmission permission of the second terminal.

Optionally, after the media transmission permission of the second terminal is canceled, the transceiver unit is further configured to send a remote transmission idle message to the first terminal, where the remote transmission idle message is used to indicate that the media transmission permission of the second terminal is canceled.

Optionally, a call session in which the second terminal is located is a group call session.

After the media transmission permission of the second terminal is canceled, the transceiver unit is further configured to send a remote transmission idle message to a third terminal, where the remote transmission idle message is used to indicate that the media transmission permission of the second terminal is canceled, and the third terminal is any terminal in the group call session.

An embodiment of this application provides an apparatus for applying for media transmission permission. The apparatus includes a processor, configured to determine that a second terminal needs to transmit media data. The apparatus also includes a transceiver, configured to send media transmission permission request indication information to a mission critical service (MCS) server, where the media transmission permission request indication information is used to instruct the MCS server to grant media transmission permission to the second terminal.

Optionally, the media transmission permission request indication information is located in a first call request message.

The first call request message is used to instruct the MCS server to establish a first call session between the apparatus and the second terminal.

Optionally, after sending the media transmission permission request indication information to the mission critical service (MCS) server, the transceiver is further configured to: receive a first call response message that is sent by the MCS server and that includes a transmission taken message.

The transmission taken message is used to indicate that the media transmission permission is granted to the second terminal, and the first call response message is sent by the MCS server after the MCS server sends a second call request message to the second terminal based on the first call request message and receives a second call response message returned by the second terminal.

Optionally, after sending the media transmission permission request indication information to the mission critical service (MCS) server, the transceiver is further configured to receive a transmission taken message sent by a transmission control server, where the transmission taken message is used to indicate that the media transmission permission is granted to the second terminal.

The transmission taken message is sent by the transmission control server after the transmission control server receives a media transmission permission request message sent by the MCS server based on the media transmission permission request indication information, and the media transmission permission request message is used to apply to the transmission control server for the media transmission permission for the second terminal.

Optionally, the media transmission permission request indication information is located in a remote private call request message.

The remote private call request message is used to instruct the MCS server to establish a second call session between the second terminal and a third terminal.

An embodiment of this application provides an apparatus for applying for media transmission permission. The apparatus includes a transceiver, configured to receive media transmission permission request indication information sent by a first terminal, where the media transmission permission request indication information is used to instruct the apparatus to grant media transmission permission to a second terminal. The apparatus also includes a processor, configured to grant the media transmission permission to the second terminal according to the media transmission permission request indication information.

Optionally, before granting the media transmission permission to the second terminal according to the media transmission permission request indication information, the processor is further configured to determine that the first terminal has permission to apply for media transmission permission for terminals except the first terminal, and that the second terminal allows terminals except the second terminal to apply for the media transmission permission for the second terminal.

Optionally, the media transmission permission request indication information is located in a first call request message.

The first call request message is used to instruct the apparatus to establish a first call session between the first terminal and the second terminal.

Optionally, the processor is configured to establish the first call session according to the first call request message; and after the first call session is established, grant, by using a transmission control server, the media transmission permission to the second terminal according to the media transmission permission request indication information.

Optionally, the processor is configured to: generate, based on the media transmission permission request indication information, a second call request message including a transmission granted message, where the transmission granted message is used to indicate that the second terminal obtains the media transmission permission, and the second call request message is used to invite the second terminal to participate in the first call session; and send the second call request message to the second terminal by using the transceiver.

Optionally, after the media transmission permission is granted to the second terminal by sending the second call request message to the second terminal, the transceiver is further configured to: send a first call response message including a transmission taken message to the first terminal, where the first call response message is sent by the apparatus after the apparatus receives a second call response message returned by the second terminal.

The transmission taken message is used to indicate that the media transmission permission is granted to the second terminal.

Optionally, the first call session is a group call session.

The media transmission permission request message is further used to instruct the transmission control server to send a transmission taken message to a third terminal in the group call session, where the transmission taken message is used to indicate that the media transmission permission is granted to the second terminal.

Optionally, the first call session is a group call session, and the transceiver is further configured to: send a third call request message to a third terminal based on the first call request message, where the third call request message is used to invite the third terminal to participate in the group call session; and send a notification message including a transmission taken message to the third terminal, where the notification message is sent by the apparatus after the apparatus receives a third call response message returned by the third terminal.

Optionally, the media transmission permission request indication information is located in a remote private call request message.

The remote private call request message is used to instruct the apparatus to establish a second call session between the second terminal and a third terminal.

An embodiment of this application provides an apparatus for applying for media transmission permission. The apparatus includes a processor, configured to after a call session between the apparatus and a second terminal is established, determine that the second terminal needs to transmit media data. The apparatus also includes a transceiver, configured to send a remote transmission request message to a target server, where the remote transmission request message is used to instruct the target server to grant media transmission permission to the second terminal, and the target server is a mission critical service (MCS) server or a transmission control server.

Optionally, after sending the remote transmission request message to the target server, the transceiver is further configured to: receive a transmission taken message sent by the target server.

The transmission taken message is used to indicate that the media transmission permission is granted to the second terminal.

An embodiment of this application provides an apparatus for applying for media transmission permission. The apparatus includes a transceiver, configured to receive a remote transmission request message sent by a first terminal, where the remote transmission request message is used to instruct the target server to grant media transmission permission to a second terminal, the remote transmission request message is sent after a call session between the first terminal and the second terminal is established, and the target server is a mission critical service (MCS) server or a transmission control server. The apparatus also includes a processor, configured to grant the media transmission permission to the second terminal.

Optionally, before granting the media transmission permission to the second terminal, the processor is further configured to: determine that the first terminal has permission to apply for media transmission permission for terminals except the first terminal, and that the second terminal allows terminals except the second terminal to apply for the media transmission permission for the second terminal.

Optionally, before granting the media transmission permission to the second terminal, the processor is further configured to: if it is determined that a third terminal is taking the media transmission permission, cancel the media transmission permission taken by the third terminal.

An embodiment of this application provides an apparatus for canceling media transmission permission. The apparatus includes a processor, configured to determine that a second terminal is taking media transmission permission to transmit media data. The apparatus also includes a transceiver, configured to send a remote transmission release message to a target server, where the remote transmission release message is used to instruct the target server to cancel the media transmission permission of the second terminal, and the target server is a mission critical service (MCS) server or a transmission control server.

Optionally, after sending the remote transmission release message to the target server, the transceiver is further configured to: receive a remote transmission idle message returned by the target server, where the remote transmission idle message is used to indicate that the media transmission permission of the second terminal is canceled.

An embodiment of this application provides an apparatus for canceling media transmission permission. The apparatus includes: a transceiver, configured to receive a remote transmission release message sent by a first terminal, where the remote transmission release message is used to instruct the target server to cancel media transmission permission of a second terminal, and the target server is a mission critical service (MCS) server or a transmission control server. The apparatus also includes a processor, configured to cancel the media transmission permission of the second terminal according to the remote transmission release message.

Optionally, before canceling the media transmission permission of the second terminal, the processor is further configured to: determine that the first terminal has permission to cancel media transmission permission of terminals except the first terminal, and that the second terminal allows terminals except the second terminal to cancel the media transmission permission of the second terminal.

Optionally, after the media transmission permission of the second terminal is canceled, the transceiver is further configured to: send a remote transmission idle message to the first terminal, where the remote transmission idle message is used to indicate that the media transmission permission of the second terminal is canceled.

Optionally, a call session in which the second terminal is located is a group call session.

After the media transmission permission of the second terminal is canceled, the transceiver is further configured to: send a remote transmission idle message to a third terminal, where the remote transmission idle message is used to indicate that the media transmission permission of the second terminal is canceled, and the third terminal is any terminal in the group call session.

DETAILED DESCRIPTION OF ILLUSTRATIVE EMBODIMENTS

The following describes the embodiments of this application in detail with reference to the accompanying drawings in this specification.

The embodiments of this application are applicable to a mission critical service system architecture, for example, to MCPTT, a mission critical video (MCVideo) service, and a mission critical data (MCData) service, in which a plurality of terminals may be allowed to simultaneously transmit media data.

Figure 1:
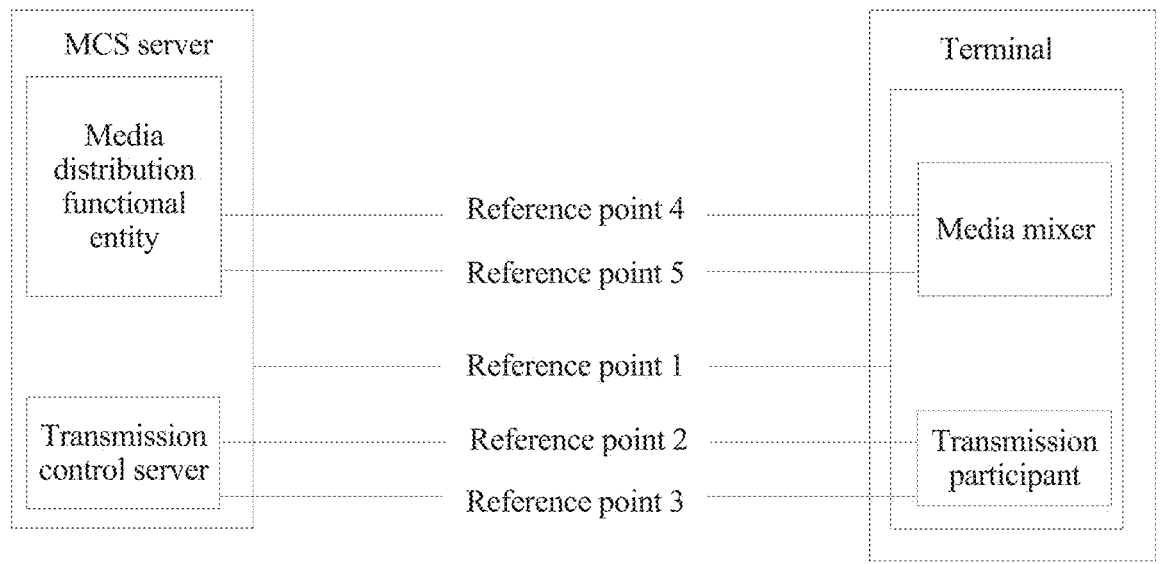
FIG. 1 is a schematic architectural diagram of an MCPTT system in a current system.

FIG. 1 is a schematic architectural diagram of an MCPTT system in the prior art. FIG. 1 includes network elements such as a mission critical service server (MCS Server), a transmission control server, and a terminal.

With reference to FIG. 1, in the embodiments of this application, the MCS Server is mainly responsible for call control and media control, and is a logical entity. In specific implementation, the mission critical service server may be a server such as an MCPTT server, an MCVideo server, or an MCData server.

The mission critical service server includes a media distribution function logical entity that is configured to receive uplink media data and transmit downlink media data.

A mission critical service client (MCS Client) may be installed in the terminal. The mission critical service client is an application layer entity equivalent to the MCS server, and is mainly responsible for processing an application layer transaction. The terminal may be a wireless terminal or a wired terminal, for example, may be a mobile phone, a computer, a tablet computer, a personal digital assistant (PDA), a mobile Internet device (MID), a wearable device, or an e-book reader.

The terminal includes at least a media mixer and a transmission participant. The media mixer is a logical function module in the terminal device, and is responsible for combining a plurality of media streams into one media stream based on media policy information. The transmission participant is configured to apply for media transmission permission.

The transmission control server is a logical functional entity, and is mainly responsible for media transmission permission control and scheduling and media data downlink transmission and scheduling. In specific implementation, the transmission control server may be a floor control server, or a corresponding logical functional entity in MCVideo or MCData. The transmission control server and the MCS server shown in FIG. 1 are deployed in one physical entity. Certainly, the transmission control server may be alternatively an independent physical entity separate from the MCS server. This is not limited in the embodiments of this application.

A reference point 1 is a reference point between the mission critical client and the mission critical server. Call control information such as a call request message or a call response message is transmitted at the reference point.

A reference point 2 and a reference point 3 are reference points between the transmission control participant and the transmission control server. A transmission control message such as a transmission request message or a transmission granted message is transmitted at the reference points. A message is transmitted at the reference point 2 in a unicast manner, and a message is transmitted at the reference point 3 in a broadcast manner.

A reference point 4 and a reference point 5 are reference points between the media distribution functional entity and the media mixer. Media data is transmitted at the reference points. Media data is transmitted at the reference point 4 in a unicast manner. Media data is transmitted at the reference point 5 in a broadcast manner.

In the embodiments of this application, media data may be data such as audio data, video data, or audio and video data, which may be determined depending on an actual situation. Details are not described herein.

Figure 2:
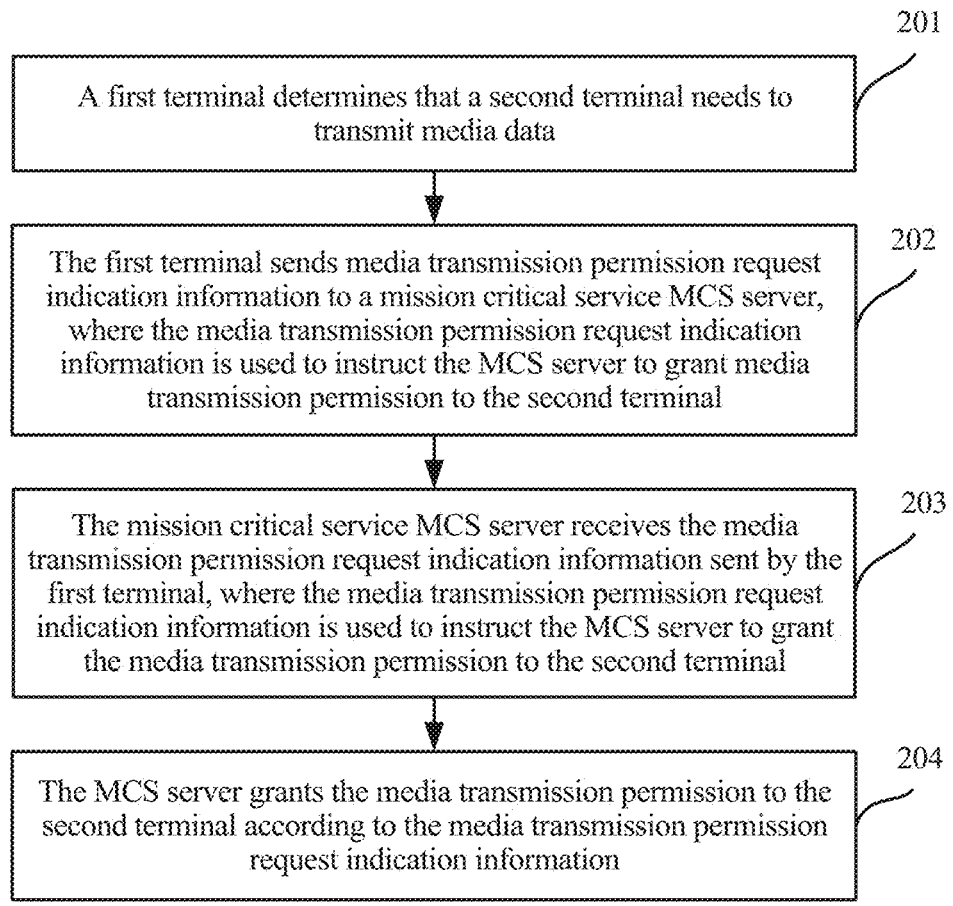
FIG. 2 is a schematic flowchart of a method for applying for media transmission permission according to an embodiment of this application.

With reference to the foregoing description, FIG. 2 is a schematic flowchart of a method for applying for media transmission permission according to an embodiment of this application.

Referring to FIG. 2, the method includes the following steps.

Step 201: A first terminal determines that a second terminal needs to transmit media data.

Step 202: The first terminal sends media transmission permission request indication information to a mission critical service (MCS) server, where the media transmission permission request indication information is used to instruct the MCS server to grant media transmission permission to the second terminal.

Step 203: The mission critical service (MCS) server receives the media transmission permission request indication information sent by the first terminal, where the media transmission permission request indication information is used to instruct the MCS server to grant the media transmission permission to the second terminal.

Step 204: The MCS server grants the media transmission permission to the second terminal according to the media transmission permission request indication information.

It should be noted that, in this embodiment of this application, an MCS client is installed in the terminal. A user may log in to the MCS client, and transmit media data by using the terminal and receive, by using the terminal, media data transmitted to the user. Users are distinguished from each other by using identities. An identity of a user may be different depending on different emergency services that are used. The identity of the user may be implemented as an MCPTT user identity (MCPTT ID), a MCVideo user identity (MCVideo ID), an MCData user identity (MCData ID), or another identity that identifies the user. This is not limited in this embodiment of this application.

In step 201, there are a plurality of manners in which the first terminal determines that the second terminal needs to transmit the media data. For example, when receiving a user identity of a second user entered by a first user, the first terminal determines that the second terminal needs to transmit the media data, where the first user uses the first terminal, and the second user uses the second terminal. For another example, the first terminal may receive a preset gesture operation entered by the user, so as to determine that the second terminal needs to transmit the media data. For another example, the second terminal notifies the first terminal of a time point or a time period in advance, and notifies the first terminal that the second terminal needs to transmit the media data at the time point or in the time period. Certainly, the foregoing descriptions are only examples. There is further another manner in which the first terminal determines that the second terminal needs to transmit the media data. Details are not described herein.

In step 202, the first terminal sends the media transmission permission request indication information by using a first call request message. The first call request message is used to instruct the MCS server to establish a first call session between the first terminal and the second terminal. In this case, the media transmission permission request indication information is located in the first call request message. The first call request message may be a group call request message. In this case, the established first call session may be a group call session. Alternatively, the first call request message may be a private call request message. In this case, the established first call session may be a private call session.

If the first call session is a group call session, the first call request message may further include information such as an identity of the first user and the identity of the second user. The identity of the first user is an identity of a user who uses the first terminal and is currently in an active state. Correspondingly, information such as the identity of the second user is an identity of a user who uses the second terminal and is currently in an active state. If the first call session is a private call session, a first call message may carry the identity of the second user.

In step 203, after the MCS server receives the media transmission permission request indication information, before the MCS server grants the media transmission permission to the second terminal according to the media transmission permission request indication information, the MCS server may further perform authentication on the first terminal and the second terminal. To be specific, the MCS server needs to determine that the first terminal has permission to apply for media transmission permission for terminals except the first terminal, and that the second terminal allows terminals except the second terminal to apply for the media transmission permission for the second terminal.

In this embodiment of this application, if the terminal is used by a user, specific steps in which the MCS server performs authentication on the first terminal and the second terminal are as follows: The MCS server determines the first user who uses the first terminal and the second user who uses the second terminal. If the MCS server determines that the first user has permission to apply for media transmission permission for users except the first user, and that the second user allows users except the second user to apply for media transmission permission for the second user, the MCS server determines that the first terminal has the permission to apply for the media transmission permission for the terminals except the first terminal, and that the second terminal allows the terminals except the second terminal to apply for the media transmission permission for the second terminal. In other words, the authentication succeeds.

Alternatively, if the MCS server determines that the first user has no permission to apply for media transmission permission for a user other than the first user, or that the second user does not allow a user other than the second user to apply for media transmission permission for the second user, the MCS server determines that the first terminal has no permission to apply for media transmission permission for a terminal other than the first terminal, and that the second terminal does not allow a terminal other than the second terminal to apply for the media transmission permission for the second terminal. In this case, the entire procedure ends.

It should be noted that permission of each user is pre-stored in the MCS server. Details are not described herein.

In step 204, the MCS server grants the media transmission permission to the second terminal according to the media transmission permission request indication information. In a possible implementation, the MCS server may establish the first call session according to the first call request message. After the first call session is established, the MCS server grants, by using a transmission control server, the media transmission permission to the second terminal according to the media transmission permission request indication information. After the first call session is established, the MCS server sends a media transmission permission request message to the transmission control server based on the media transmission permission request indication information. The media transmission permission request message is used to apply to the transmission control server for the media transmission permission for the second terminal. The transmission control server subsequently grants the media transmission permission to the second terminal according to the media transmission permission request message, and sends a transmission granted message to the second terminal. The transmission granted message is used to indicate that the second terminal obtains the media transmission permission and can transmit the media data.

Optionally, the transmission control server further sends a transmission taken message to the first terminal. The transmission taken message is used to notify the first terminal that the media transmission permission is granted to the second terminal.

It should be noted that, in this embodiment of this application, during a call session, the media transmission permission may be simultaneously granted to at least one terminal. A quantity of terminals to which the media transmission permission is granted may be determined depending on an actual situation. Details are not described herein.

In a possible implementation, the MCS server may grant the media transmission permission to the second terminal when establishing the first call session. The MCS server may generate, based on the media transmission permission request indication information, a second call request message including a transmission granted message. The second call request message is used to invite the second terminal to participate in the first call session. The MCS server sends the second call request message to the second terminal.

The foregoing process is described below with reference to specific embodiments.

Figure 3:
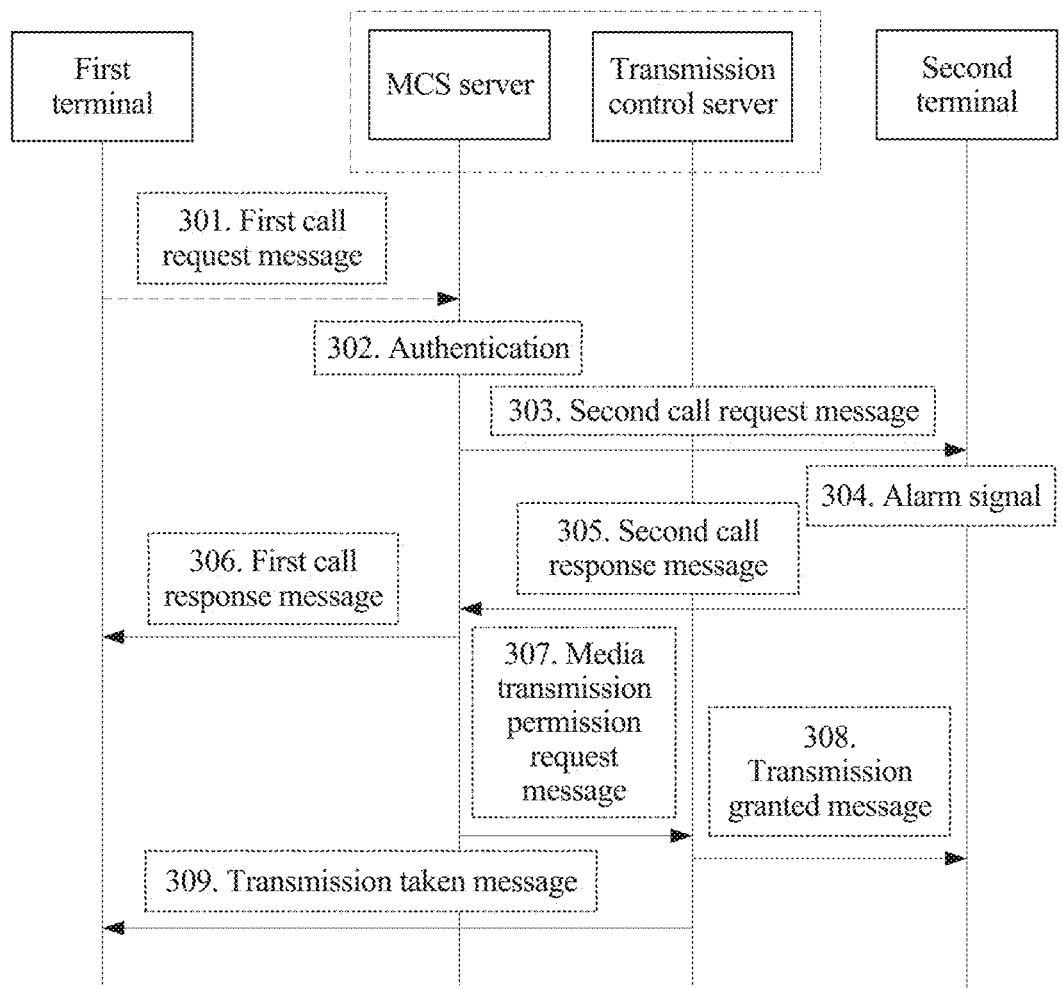
FIG. 3 is a schematic flowchart of a method for applying for media transmission permission according to an embodiment of this application.

FIG. 3 is a schematic flowchart of a method for applying for media transmission permission according to an embodiment of this application.

In a procedure shown in FIG. 3, a first terminal sends media transmission permission request indication information by using a first call request message. After establishing a first call session according to the first call request message, a MCS server grants, by using a transmission control server, media transmission permission to a second terminal according to the media transmission permission request indication information. The first call session is a private call session.

Step 301: The first terminal sends the first call request message including the media transmission permission request indication information to the MCS server.

The first call request message may further include information such as an identity of a first user and an identity of a second user.

Step 302: The MCS server performs authentication on the first terminal and the second terminal. If the authentication succeeds, proceed to step 303a; or if the authentication fails, end the entire procedure.

For specific content of the authentication performed by the MCS server, refer to the foregoing description. Details are not described herein again.

Step 303a: The MCS server sends a second call request message to the second terminal.

The second call request message may include information such as the identity of the first user and the identity of the second user.

Step 303: The MCS server sends a third call request message to a third terminal, where the third call request message is used to invite the third terminal to participate in the group call session.

Optionally, step 304: The second terminal determines, based on the second call request message, that the second terminal needs to transmit media data, and sends an alarm signal to a second user who uses the second terminal, to remind the second user to transmit the media data. The alarm signal may be a pop-up message on a display screen, a sound signal, an optical signal, or the like. This is not limited in this embodiment of this application.

For example, after the second terminal receives the second call request message, a window may pop up on the display screen, to remind the second user that the second user needs to transmit the media data.

Step 305: If the second terminal accepts the second call request message, the second terminal returns a second call response message to the MCS server.

It should be noted that, if the second terminal rejects the second call request message, the second terminal returns, to the MCS server, a message indicating that session establishment fails. In this embodiment of this application, an example in which the second terminal accepts the second call request message is used for description, and a scenario in which the second terminal rejects the second call request message is not described.

Step 306: The MCS server returns a first call response message to the first terminal.

In this case, the first call session has been established, and the MCS server grants the media transmission permission to the second terminal by using the transmission control server. If the MCS server and the transmission control server are one physical entity, the MCS server may directly instruct the transmission control server to grant the media transmission permission to the second terminal.

If the MCS server and the transmission control server are different physical entities, step 307 is further performed. Step 307: The MCS server may send a media transmission permission request message to the transmission control server, where the media transmission permission request message is used to apply to the transmission control server for media transmission permission for the second terminal.

Step 308: The transmission control server sends a transmission granted message to the second terminal.

Step 309: The transmission control server sends a transmission taken message to the first terminal.

An execution sequence of step 308 and step 309 is not limited in this embodiment of this application.

After the first call session is established, and the second terminal receives the transmission granted message, the second terminal may transmit the media data to a terminal in the first call session.

Figure 4:
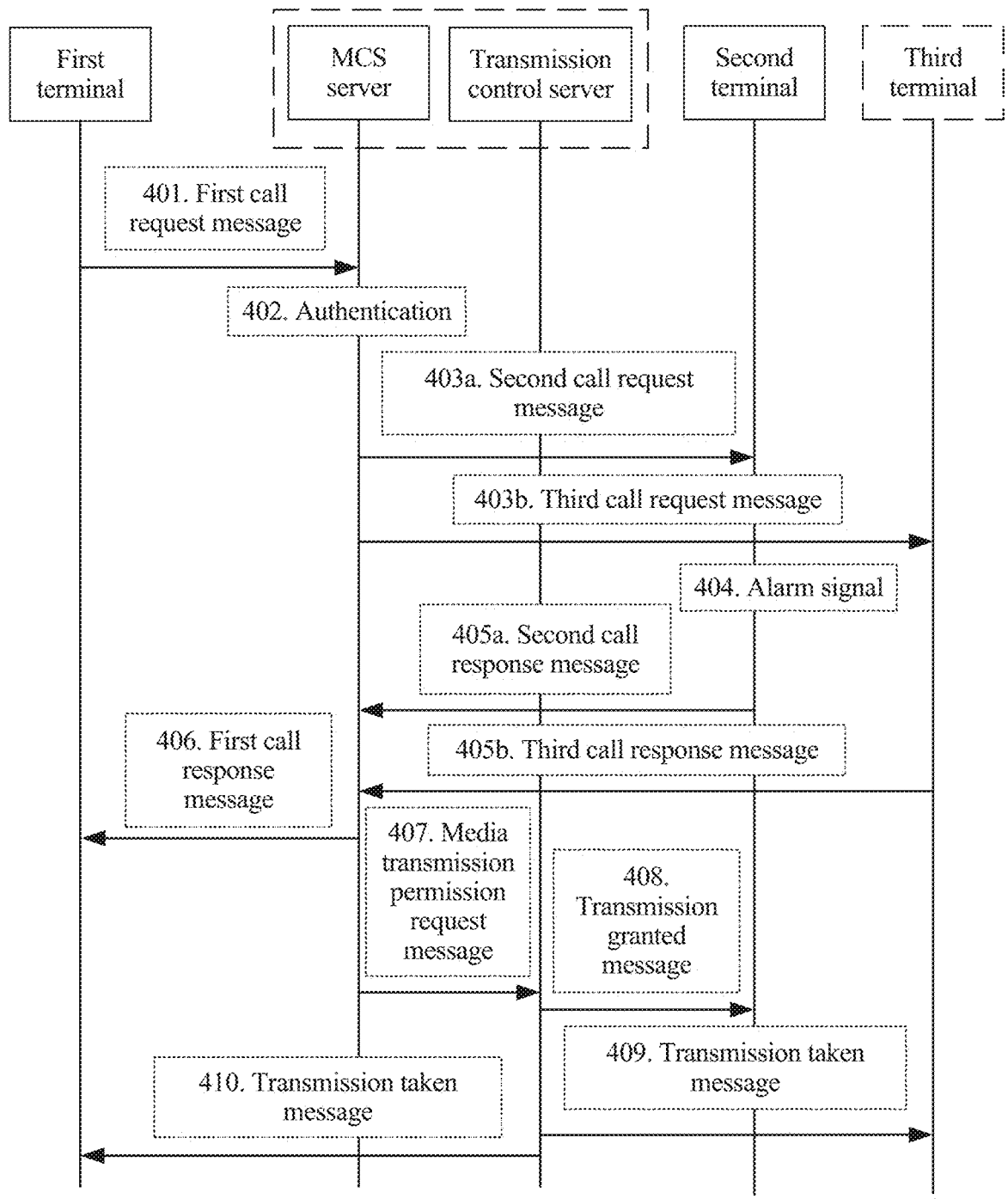
FIG. 4 is a schematic flowchart of a method for applying for media transmission permission according to an embodiment of this application.

FIG. 4 is a schematic flowchart of a method for applying for media transmission permission according to an embodiment of this application.

In a procedure shown in FIG. 4, a first terminal sends media transmission permission request indication information by using a first call request message. After establishing a first call session according to the first call request message, a MCS server grants, by using a transmission control server, media transmission permission to the second terminal according to the media transmission permission request indication information. The first call session is a group call session.

Step 401: The first terminal sends the first call request message including the media transmission permission request indication information to the MCS server.

The first call request message may further include information such as an identity of a first user and an identity of a second user.

Step 402: The MCS server performs authentication on the first terminal and the second terminal. If the authentication succeeds, proceed to step 403a; or if the authentication fails, end the entire procedure.

For specific content of the authentication performed by the MCS server, refer to the foregoing description. Details are not described herein again.

Step 403a: The MCS server sends a second call request message to the second terminal.

The second call request message may include information such as the identity of the first user and the identity of the second user.

Step 403b: The MCS server sends a third call request message to a third terminal, where the third call request message is used to invite the third terminal to participate in a group call session.

Optionally, step 404: The second terminal determines, based on the second call request message, that the second terminal needs to transmit media data, and sends an alarm signal to a second user who uses the second terminal, to remind the second user to transmit the media data. The alarm signal may be a pop-up message on a display screen, a sound signal, an optical signal, or the like. This is not limited in this embodiment of this application.

Step 405a: The second terminal accepts the second call request message, and returns a second call response message to the MCS server.

Step 405b: The third terminal accepts the third call request message, and returns a third call response message to the MCS server.

Step 406: The MCS server returns a first call response message to the first terminal.

In this case, the first call session has been established, and the MCS server grants the media transmission permission to the second terminal by using the transmission control server. If the MCS server and the transmission control server are one physical entity, the MCS server may directly instruct the transmission control server to grant the media transmission permission to the second terminal.

If the MCS server and the transmission control server are different physical entities, step 407 is further performed. Step 407: The MCS server may send a media transmission permission request message to the transmission control server, where the media transmission permission request message is used to apply to the transmission control server for media transmission permission for the second terminal.

Step 408: The transmission control server sends a transmission granted message to the second terminal.

Step 409: The transmission control server sends a transmission taken message to the third terminal.

Step 410: The transmission control server sends a transmission taken message to the first terminal.

An execution sequence of step 408, step 409, and step 410 is not limited in this embodiment of this application.

After the first call session is established, the second terminal may transmit the media data to a terminal in the first call session.

Figure 5:
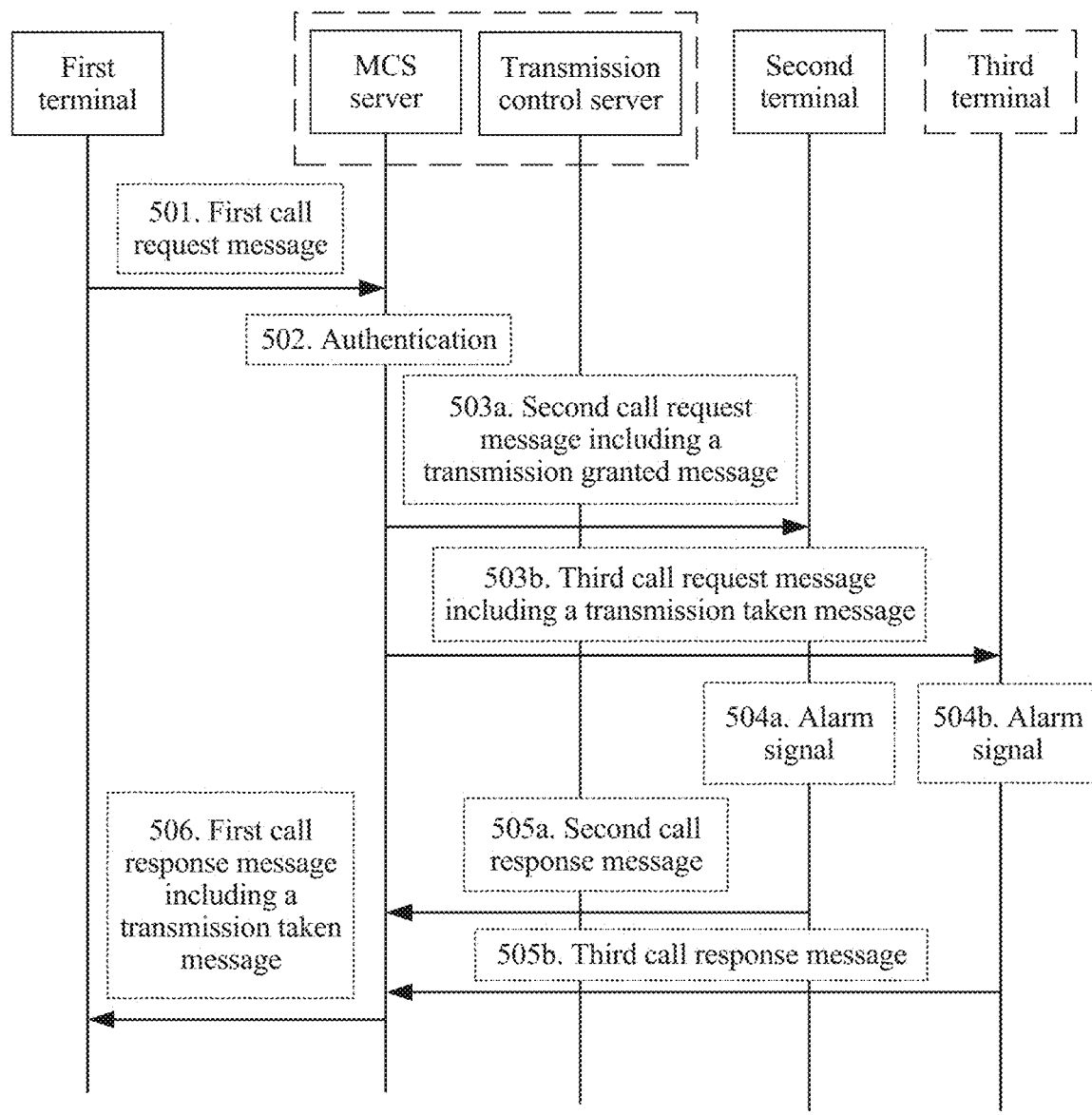
FIG. 5 is a schematic flowchart of a method for applying for media transmission permission according to an embodiment of this application.

The MCS server may further grant the media transmission permission to the second terminal when establishing the first call session. FIG. 5 is a schematic flowchart of a method for applying for media transmission permission according to an embodiment of this application.

In a procedure shown in FIG. 5, a first terminal sends media transmission permission request indication information by using a first call request message. An MCS server grants media transmission permission to the second terminal when establishing a first call session according to the first call request message.

Step 501: The first terminal sends the first call request message including the media transmission permission request indication information to the MCS server.

The first call request message may further include information such as an identity of a first user and an identity of a second user.

Step 502: The MCS server performs authentication on the first terminal and the second terminal. If the authentication succeeds, proceed to step 503a; or if the authentication fails, end the entire procedure.

For specific content of the authentication performed by the MCS server, refer to the foregoing description. Details are not described herein again.

Step 503a: The MCS server sends a second call request message including a transmission granted message to the second terminal. The transmission granted message is encapsulated in the second call request message.

The second call request message may further include information such as the identity of the first user and the identity of the second user.

If the first call request message is used to establish a group call session, step 503b is further performed.

Step 503b: The MCS server sends a third call request message to a third terminal, where the third call request message includes a transmission taken message.

The third call request message may further include information such as the identity of the first user, the identity of the second user, and an identity of a third user. The identity of the third user is an identity of a user who currently uses the third terminal and is currently in an active state.

Optionally, step 504a: The second terminal determines, based on the second call request message, that the second terminal needs to transmit media data, and sends an alarm signal to a second user who uses the second terminal, to remind the second user to transmit the media data. For specific content of the alarm signal, refer to the foregoing description. Details are not described herein again.

If the first call request message is used to establish a group call session, optionally, step 504b is performed. Step 504b: The third terminal determines, based on the third call request message, to send an alarm signal to a third user who uses the third terminal, to notify the third user of an incoming call.

Step 505a: If the second terminal accepts the second call request message, the second terminal returns a second call response message to the MCS server.

It should be noted that, if the second terminal rejects the second call request message, the second terminal returns, to the MCS server, a message indicating that session establishment fails. In this embodiment of this application, an example in which the second terminal accepts the second call request message is used for description, and a scenario in which the second terminal rejects the second call request message is not described.

If the first call request message is used to establish a group call session, step 505b is further performed.

Step 505b: If the third terminal accepts the third call request message, the third terminal returns a third call response message to the MCS server.

Step 506: The MCS server returns a first call response message including a transmission taken message to the first terminal.

In this case, the first call session has been established, and the second terminal may transmit the media data to a terminal in the first call session.

In the embodiments of this application, the first terminal may further apply for the media transmission permission for the second terminal by establishing a second call session for the second terminal. The second call session is a private call session between the third terminal and the second terminal.

In step 202, in a possible implementation, the first terminal sends, to the MCS server, a remote private call request message including the media transmission permission request indication information. The remote private call request message is used to instruct the MCS server to establish the second call session between the second terminal and the third terminal.

In this case, in step 203, after receiving the remote private call request message, the MCS server first establishes the second call session, and after the second call session is established, sends a transmission granted message to the second terminal by using a transmission control server, so as to grant the media transmission permission to the second terminal. Alternatively, when establishing the second call session, the MCS server grants the media transmission permission to the second terminal by sending a call request message including a transmission granted message to the second terminal.

In a possible implementation, the first terminal sends a remote transmit media request message including the media transmission permission request indication information to the MCS server. The remote transmit media request message is used to instruct the MCS server to instruct the second terminal to transmit the media data to the third terminal.

The remote transmit media request message sent by the first terminal may further include information such as the identity of the first user, the identity of the second user, and the identity of the third user.

In this case, in step 203, after receiving the remote transmit media request message, the MCS server grants, by using the transmission control server, the media transmission permission to the second terminal according to the media transmission permission request indication information.

The foregoing process is described below with reference to specific embodiments.

Figure 6:
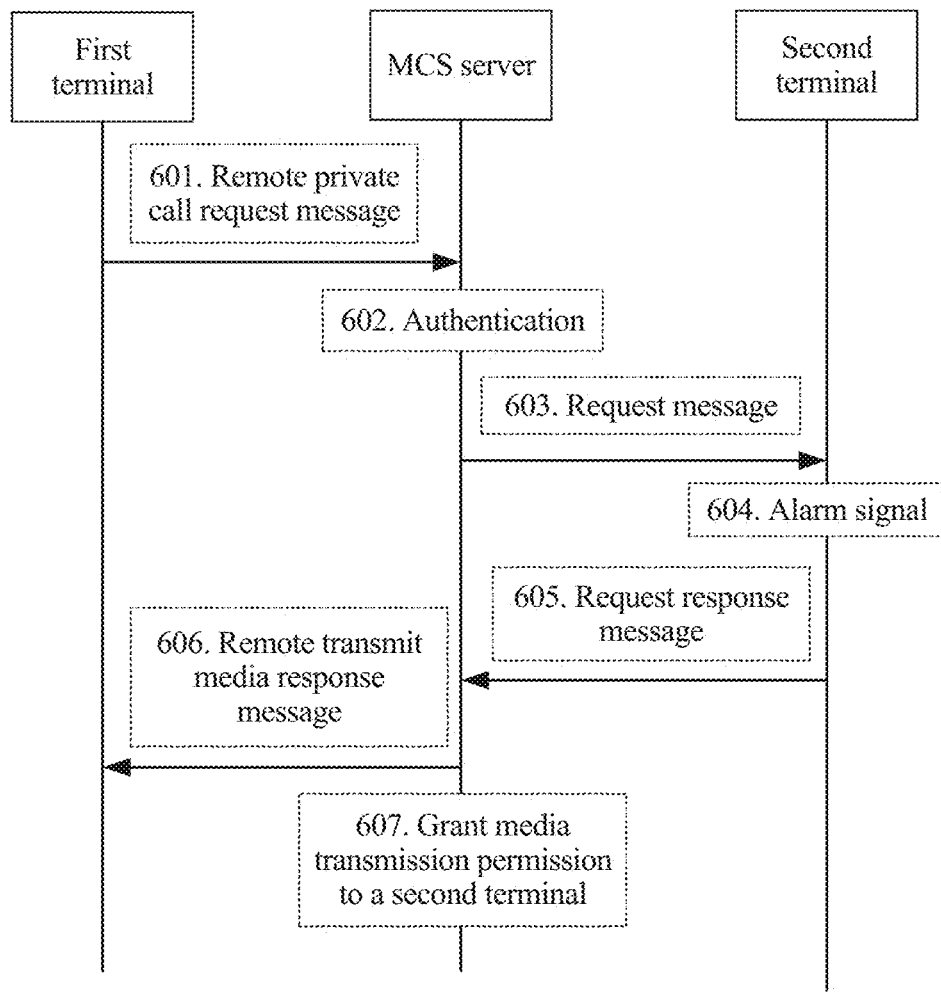
FIG. 6 is a schematic flowchart of a method for applying for media transmission permission according to an embodiment of this application.

FIG. 6 is a schematic flowchart of a method for applying for media transmission permission according to an embodiment of this application.

In a procedure shown in FIG. 6, a first terminal sends media transmission permission request indication information by using a remote private call request message. An MCS server establishes a second call session between a second terminal and a third terminal according to the remote private call request message, and grants media transmission permission to the second terminal.

Step 601: The first terminal sends the remote transmit media request message including the media transmission permission request indication information to the MCS server.

The remote private call request message may further include information such as an identity of a first user and an identity of a second user.

Step 602: The MCS server performs authentication on the first terminal and the second terminal. If the authentication succeeds, proceed to step 603; or if the authentication fails, end the entire procedure.

For specific content of the authentication performed by the MCS server, refer to the foregoing description. Details are not described herein again.

Step 603: The MCS server sends a request message to the second terminal, to request a second call session to be established for the second terminal.

The request message may be a remote media transmit request, and may include information such as the identity of the first user, the identity of the second user, an identity of a third user, and the media transmission permission request indication information.

Optionally, step 604: The second terminal sends, based on the remote transmit media request message, an alarm signal to a second user who uses the second terminal, to notify the second user that the first terminal requires the second terminal to transmit media data to the third terminal. For specific content of the alarm signal, refer to the foregoing description. Details are not described herein again.

Step 605: The second terminal returns a request response message to the MCS server.

Step 606: The MCS server returns a remote transmit media response message to the first terminal.

Step 607: The MCS server establishes the second call session between the second terminal and the third terminal, and grants media transmission permission to the second terminal. In an optional implementation, the message triggers the second terminal to initiate a process for establishing a private call session between the second terminal and the third terminal, and the call request message carries implicit indication information for transmitting media transmission permission. After the private call session is established, the media transmission permission is granted to the second terminal. In this case, the second terminal may transmit the media data to the third terminal.

Figure 7:
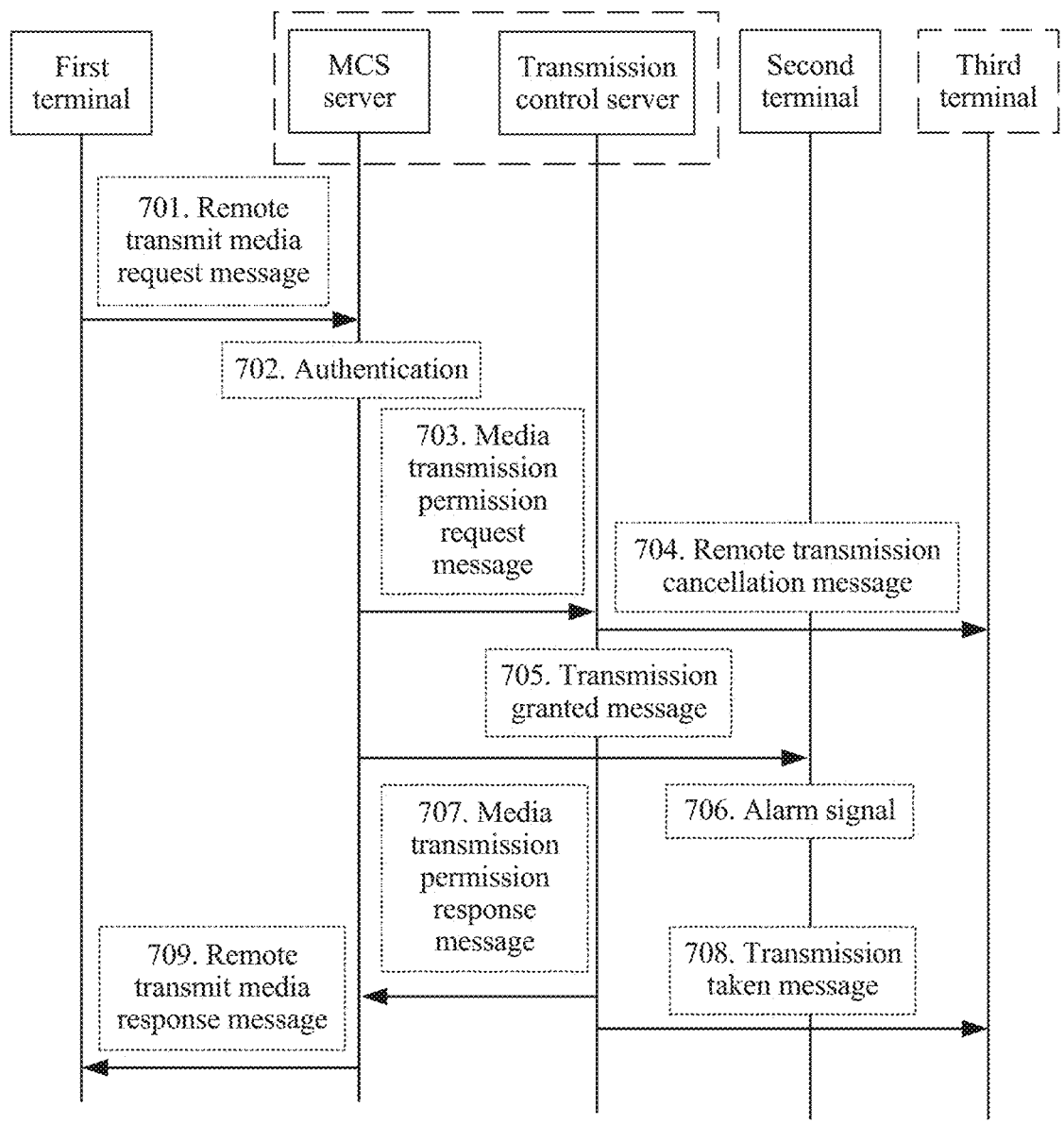
FIG. 7 is a schematic flowchart of a method for applying for media transmission permission according to an embodiment of this application.

FIG. 7 is a schematic flowchart of a method for applying for media transmission permission according to an embodiment of this application.

In a procedure shown in FIG. 7, a first terminal sends media transmission permission request indication information by using a remote transmit media request message. A second call session between a second terminal and a third terminal has been established.

Step 701: The first terminal sends the remote transmit media request message including the media transmission permission request indication information to an MCS server.

The remote transmit media request message may further include information such as an identity of a first user, an identity of a second user, and an identity of a third user.

Step 702: The MCS server performs authentication on the first terminal and the second terminal. If the authentication succeeds, proceed to step 703; or if the authentication fails, end the entire procedure.

For specific content of the authentication performed by the MCS server, refer to the foregoing description. Details are not described herein again.

If the MCS server and a transmission control server are different physical entities, step 703 is further performed.

Step 703: The MCS server sends a media transmission permission request message to a transmission control server based on the media transmission permission request indication information.

Optionally, step 704: If the transmission control server determines that media transmission permission is taken by the third terminal, the transmission control server sends a remote transmission cancellation message to the third terminal, to cancel the media transmission permission used by the third terminal, and the third terminal no longer transmits media data after receiving the message.

Step 705: The transmission control server sends a transmission granted message to the second terminal.

Optionally, step 706: The second terminal sends, based on the transmission granted message, an alarm signal to a second user who uses the second terminal, to notify the second user that the first terminal requests the second terminal to transmit media data to the third terminal. For specific content of the alarm signal, refer to the foregoing description. Details are not described herein again.

If the MCS server and the transmission control server are different physical entities, step 707 is further performed.

Step 707: The transmission control server sends a media transmission permission response message to the MCS server, to indicate that the media transmission permission is granted to the second terminal.

Step 708: The transmission control server sends a transmission taken message to the third terminal.

Step 709: The MCS server sends a remote transmit media response message to the first terminal, to indicate that the media transmission permission is granted to the second terminal.

It should be noted that an execution sequence of step 708 and step 709 is not limited herein.

Figure 8:
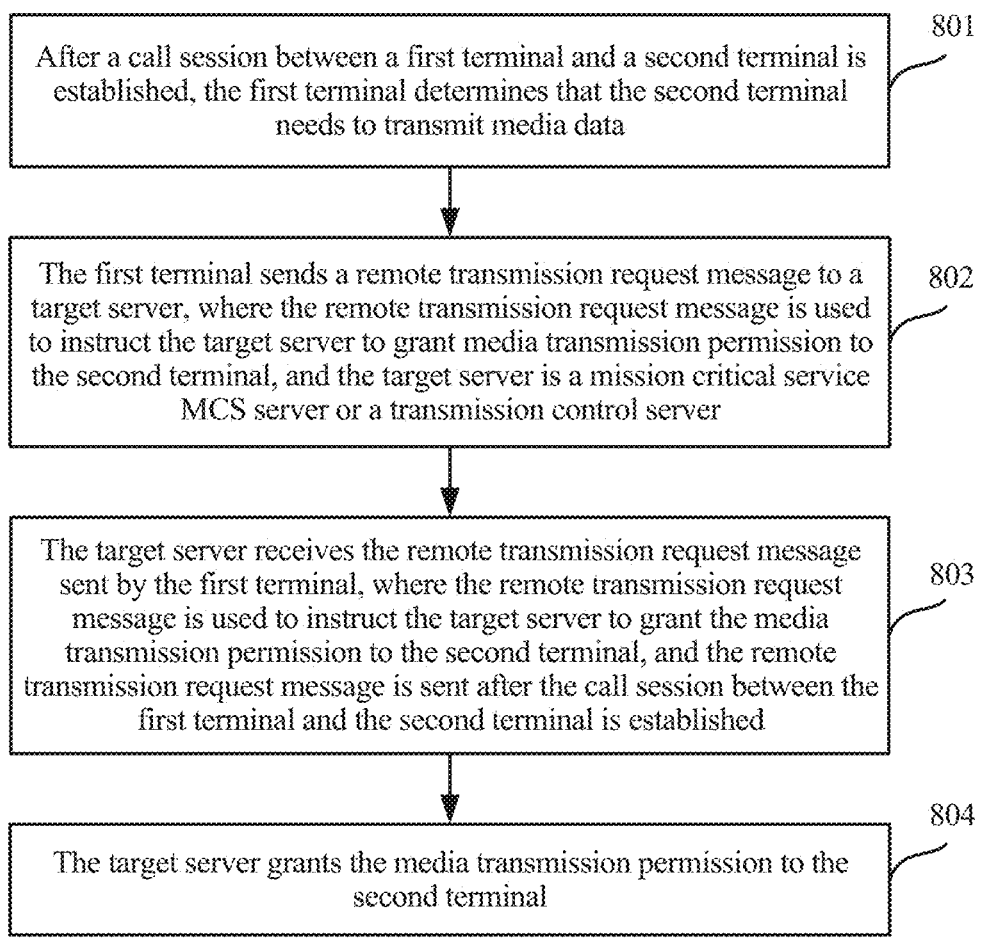
FIG. 8 is a schematic flowchart of a method for applying for media transmission permission according to an embodiment of this application.

Based on the foregoing description, FIG. 8 is a schematic flowchart of a method for applying for media transmission permission according to an embodiment of this application.

As shown in FIG. 8, the method includes the following steps.

Step 801: After a call session between a first terminal and a second terminal is established, the first terminal determines that the second terminal needs to transmit media data.

The first terminal may immediately determine, after the session is established, that the second terminal needs to transmit the media data, or determine, at any other moment, that the second terminal needs to transmit the media data.

Step 802: The first terminal sends a remote transmission request message to a target server, where the remote transmission request message is used to instruct the target server to grant media transmission permission to the second terminal, and the target server is a mission critical service (MCS) server or a transmission control server.

Step 803: The target server receives the remote transmission request message sent by the first terminal, where the remote transmission request message is used to instruct the target server to grant the media transmission permission to the second terminal, and the remote transmission request message is sent after the call session between the first terminal and the second terminal is established.

Step 804: The target server grants the media transmission permission to the second terminal.

In step 801, the call session between the first terminal and the second terminal may be a group call session or a private call session. This is not limited in this embodiment of this application.

There are a plurality of manners in which the first terminal determines that the second terminal needs to transmit the media data. For details, refer to the description in step 201. Details are not described herein again.

In step 802, after the first terminal sends the remote transmission request message to the target server, if the target server grants the media transmission permission to the second terminal, the first terminal further receives a transmission taken message sent by the target server, where the transmission taken message is used to indicate that the media transmission permission is granted to the second terminal.

In step 803, after receiving the remote transmission request message, the target server may further perform authentication on a first user and a second user. For a specific authentication method, refer to the foregoing description. Details are not described herein again.

Step 804: Before the target server grants the media transmission permission to the second terminal, the target server may further first determine, based on a media transmission policy, whether a terminal that takes the media transmission permission exists. If the target server determines that a third terminal is taking the media transmission permission, and that only one terminal is currently allowed to transmit the media data, the target server cancels the media transmission permission taken by the third terminal. Alternatively, if media transmission of a requester cannot be performed based on current system resources, and a current system supports media transmission permission preemption, the target server may preempt media transmission permission of one or more users based on a media transmission policy and information about the requester and a user who currently transmits the media data by using the media transmission permission. To be specific, the target server cancels the media transmission permission of a preempted user, and grants the media transmission permission to the requester. Alternatively, if a policy allows a plurality of users to simultaneously perform transmission, and a quantity of users who currently transmit the media data does not reach an upper limit, the user directly grants the media transmission permission to the requester.

The target server may send a transmission granted message to the second terminal, to grant the media transmission permission to the second terminal.

After granting the media transmission permission to the second terminal, the target server may further send the transmission taken message to the first terminal, to notify the first terminal that the media transmission permission is granted to the second terminal.

The foregoing process is described below by using specific embodiments.

Figure 9:
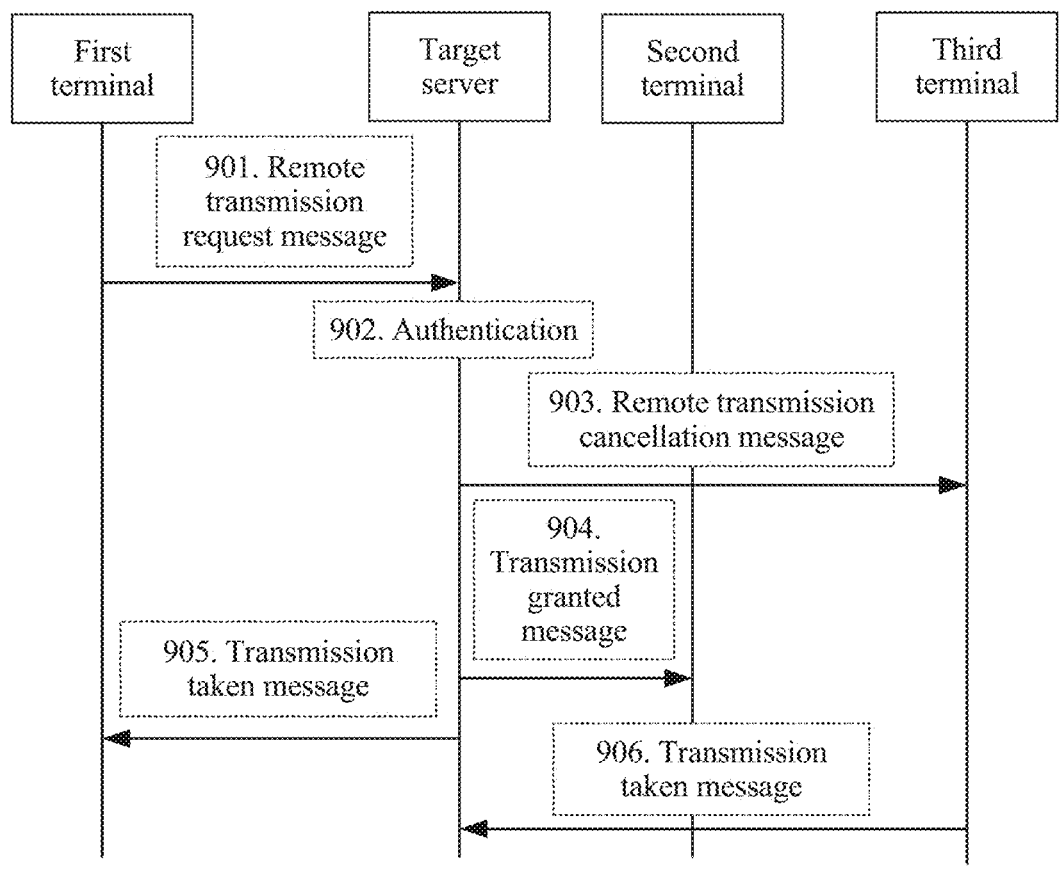
FIG. 9 is a schematic flowchart of a method for canceling media transmission permission according to an embodiment of this application.

FIG. 9 is a schematic flowchart of a method for applying for media transmission permission according to an embodiment of this application.

In a procedure shown in FIG. 9, a call session between a first terminal and a second terminal has been established.

Step 901: The first terminal sends a remote transmission request message to a target server.

The remote transmission request message may further include information such as an identity of a first user and an identity of a second user.

Step 902: The target server performs authentication on the first terminal and the second terminal. If the authentication succeeds, proceed to a next step; or if the authentication fails, end the entire procedure.

For specific content of the authentication performed by the target server, refer to the foregoing description. Details are not described herein again.

Optionally, if the call session between the first terminal and the second terminal is a group call session, step 903 is further performed.

Step 903: If the target server determines that media transmission permission is taken by a third terminal, and that only one terminal is currently allowed to transmit media data, or if media transmission of a requester cannot be performed based on current system resources, and a current system supports media transmission permission preemption, the target server cancels the media transmission permission taken by the third terminal.

The target server may send a remote transmission cancellation message to the third terminal, to cancel the media transmission permission used by the third terminal.

Step 904: The target server sends a transmission granted message to the second terminal.

Step 905: The target server sends a transmission taken message to the first terminal.

If the call session between the first terminal and the second terminal is a group call session, step 906 is further performed.

Step 906: The target server sends a transmission taken message to the third terminal, where the third terminal is any terminal in a call session.

Figure 10:
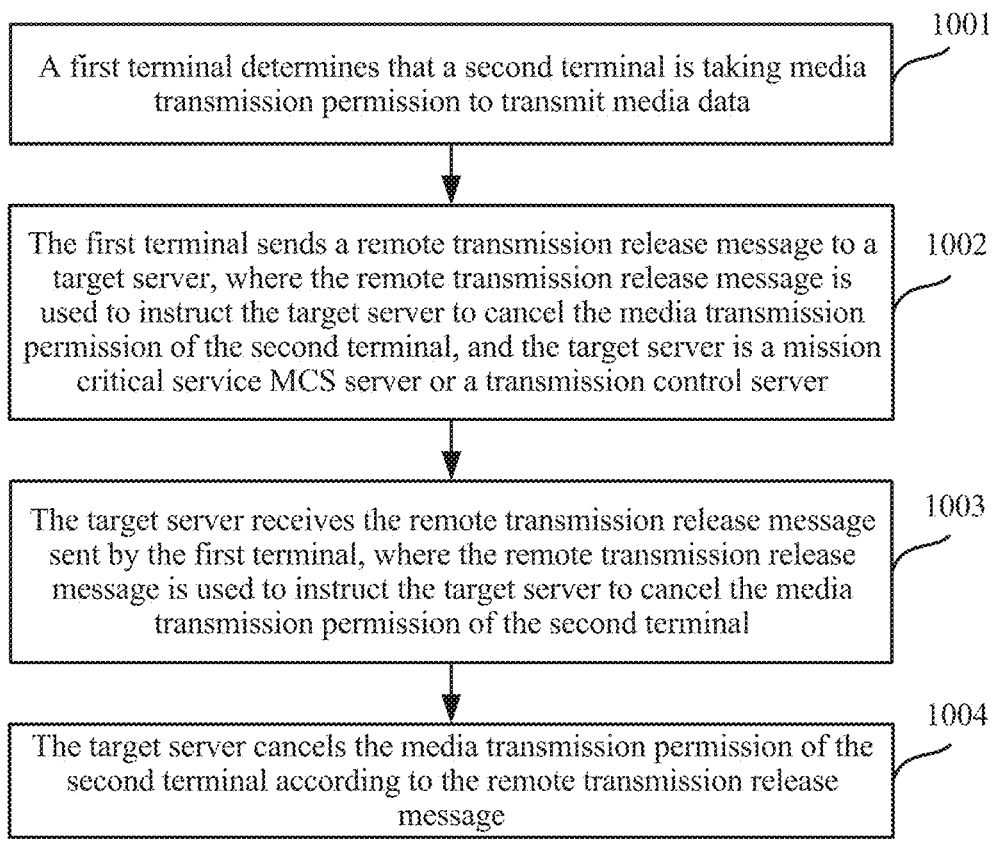
FIG. 10 is a schematic flowchart of a method for canceling media transmission permission according to an embodiment of this application.

Based on the foregoing description, as shown in FIG. 10, FIG. 10 is a schematic flowchart of a method for canceling media transmission permission according to an embodiment of this application.

As shown in FIG. 10, the method includes the following steps.

Step 1001: A first terminal determines that a second terminal is taking media transmission permission to transmit media data.

Step 1002: The first terminal sends a remote transmission release message to a target server, where the remote transmission release message is used to instruct the target server to cancel the media transmission permission of the second terminal, and the target server is a mission critical service (MCS) server or a transmission control server.

Step 1003: The target server receives the remote transmission release message sent by the first terminal, where the remote transmission release message is used to instruct the target server to cancel the media transmission permission of the second terminal.

Step 1004: The target server cancels the media transmission permission of the second terminal according to the remote transmission release message.

In step 1001, if the first terminal determines that the second terminal is transmitting the media data, the first terminal may determine that the second terminal is taking the media transmission permission. Certainly, there may be another manner in which the first terminal determines that the second terminal is taking the media transmission permission. Details are not described herein.

It should be noted that the first terminal and the second terminal may be located in one private call session or one group call session. The first terminal and the second terminal may be further located in different call sessions. This is not limited in this embodiment of this application. When the first terminal and the second terminal are located in different call sessions, the target server is an MCS server.

In step 1002, the remote transmission release message sent by the first terminal to the target server may be a remote transmission release message, a remote media transmit stop request message, or the like.

The remote transmission release message may include information such as an identity of a first user and an identity of a second user.

After the target server cancels the media transmission permission taken by the second terminal, the first terminal may receive a remote transmission idle message returned by the target server. The remote transmission idle message is used to indicate that the media transmission permission of the second terminal is canceled.

In step 1003, after receiving the remote transmission release message, the target server may first perform authentication on the first terminal and the second terminal.

In this embodiment of this application, if the terminal is used by a user, specific steps in which the target server performs authentication on the first terminal and the second terminal are as follows: The target server determines the first user who uses the first terminal and the second user who uses the second terminal. If the target server determines that the first user has permission to cancel media transmission permission of users except the first user, and that the second user allows users except the second user to cancel media transmission permission of the second user, the target server determines that the first terminal has permission to cancel media transmission permission of terminals except the first terminal, and that the second terminal allows terminals except the second terminal to cancel the media transmission permission of the second terminal. In other words, the authentication succeeds.

Alternatively, if the target server determines that the first user has no permission to cancel media transmission permission of a user other than the first user, or that the second user does not allow a user other than the second user to cancel media transmission permission of the second user, the target server determines that the first terminal has no permission to cancel media transmission permission of a terminal other than the first terminal, and that the second terminal does not allow a terminal other than the second terminal to cancel the media transmission permission of the second terminal. In this case, the entire procedure ends.

It should be noted that permission of each user is pre-stored in the target server. Details are not described herein.

In step 1004, if the first terminal and the second terminal are located in one private call session or one group call session, the target server directly sends a remote transmission cancellation message to the second terminal, to cancel the media transmission permission of the second terminal.

In this implementation, after canceling the media transmission permission of the second terminal, the target server may further send a remote transmission idle message to the first terminal. The remote transmission idle message is used to indicate that the media transmission permission of the second terminal is canceled, and that more resources in a current system may be used for media data transmission. The remote transmission idle message may be a remote transmission idle message or a floor idle message. A specific remote transmission idle message may be determined depending on an actual situation. Details are not described herein.

Optionally, if a call session in which the second terminal is located is a group call session, the target server may further send a remote transmission idle message to a third terminal. The third terminal is any terminal in the group call session in which the second terminal is located.

If the first terminal and the second terminal are located in different call sessions, the target server needs to send a cancellation indication message to the transmission control server, to instruct the transmission control server to cancel the media transmission permission of the second terminal. After receiving the cancellation indication message, the transmission control server sends a remote transmission cancellation message to the second terminal, to cancel the media transmission permission of the second terminal. The second terminal cannot transmit media data again until the second terminal obtains the media transmission permission again. The transmission control server subsequently sends a cancellation response message to the MCS server, to notify the target server that the media transmission permission of the second terminal has been canceled. In addition, the transmission control server may further send a remote transmission idle message to the third terminal that receives the media data transmitted by the second terminal. The remote transmission idle message is used to indicate that the media transmission permission of the second terminal is canceled.

Optionally, in this implementation, after receiving the cancellation response message, the target server sends a remote transmission idle message to the first terminal. The remote transmission idle message may be a remote media transmit stop response message. A specific remote transmission idle message may be determined depending on an actual situation. Details are not described herein.

The foregoing process is described below by using specific embodiments.

Figure 11:
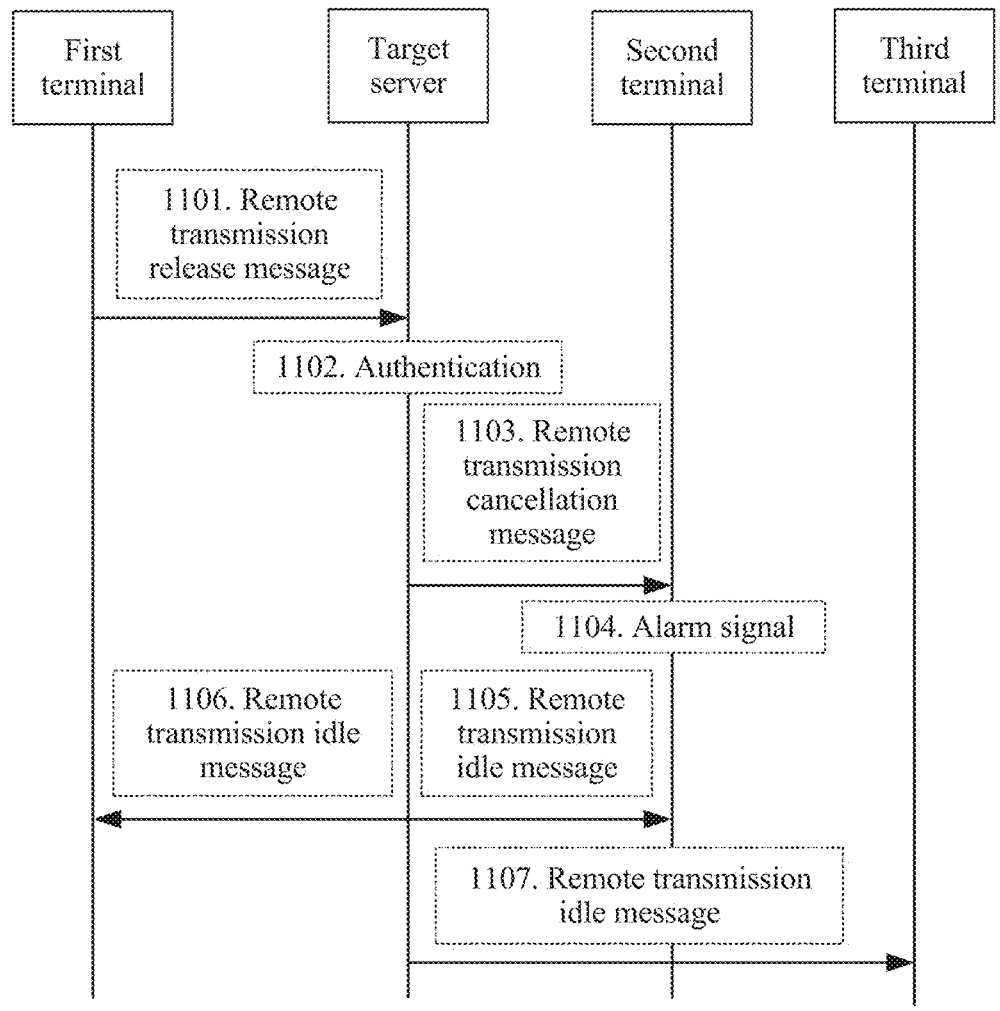
FIG. 11 is a schematic flowchart of a method for canceling media transmission permission according to an embodiment of this application.

FIG. 11 is a schematic flowchart of a method for canceling media transmission permission according to an embodiment of this application.

In a procedure shown in FIG. 11, a first terminal and a second terminal are located in one call session.

Step 1101: The first terminal sends a remote transmission release message to a target server.

The remote transmission release message may further include information such as an identity of a first user and an identity of a second user.

Step 1102: The target server performs authentication on the first terminal and the second terminal. If the authentication succeeds, proceed to a next step; or if the authentication fails, end the entire procedure.

For specific content of the authentication performed by the target server, refer to the foregoing description. Details are not described herein again.

Step 1103: The target server sends a remote transmission cancellation message to the second terminal.

Optionally, step 1104: The second terminal sends an alarm signal, to remind a user that media transmission permission of the second terminal is canceled, and that the second terminal is no longer allowed to transmit media data. For specific content of the alarm signal, refer to the foregoing description. Details are not described herein again.

Step 1105: Optionally, the target server sends a remote transmission idle message to the second terminal.

Step 1106: The target server sends a remote transmission idle message to the first terminal.

If the call session between the first terminal and the second terminal is a group call session, step 1107 is further performed.

Step 1107: The target server sends a remote transmission idle message to a third terminal, where the third terminal is any terminal in a call session.

An execution sequence of step 1105 to step 1107 is not limited. Details are not described herein.

Figure 12:
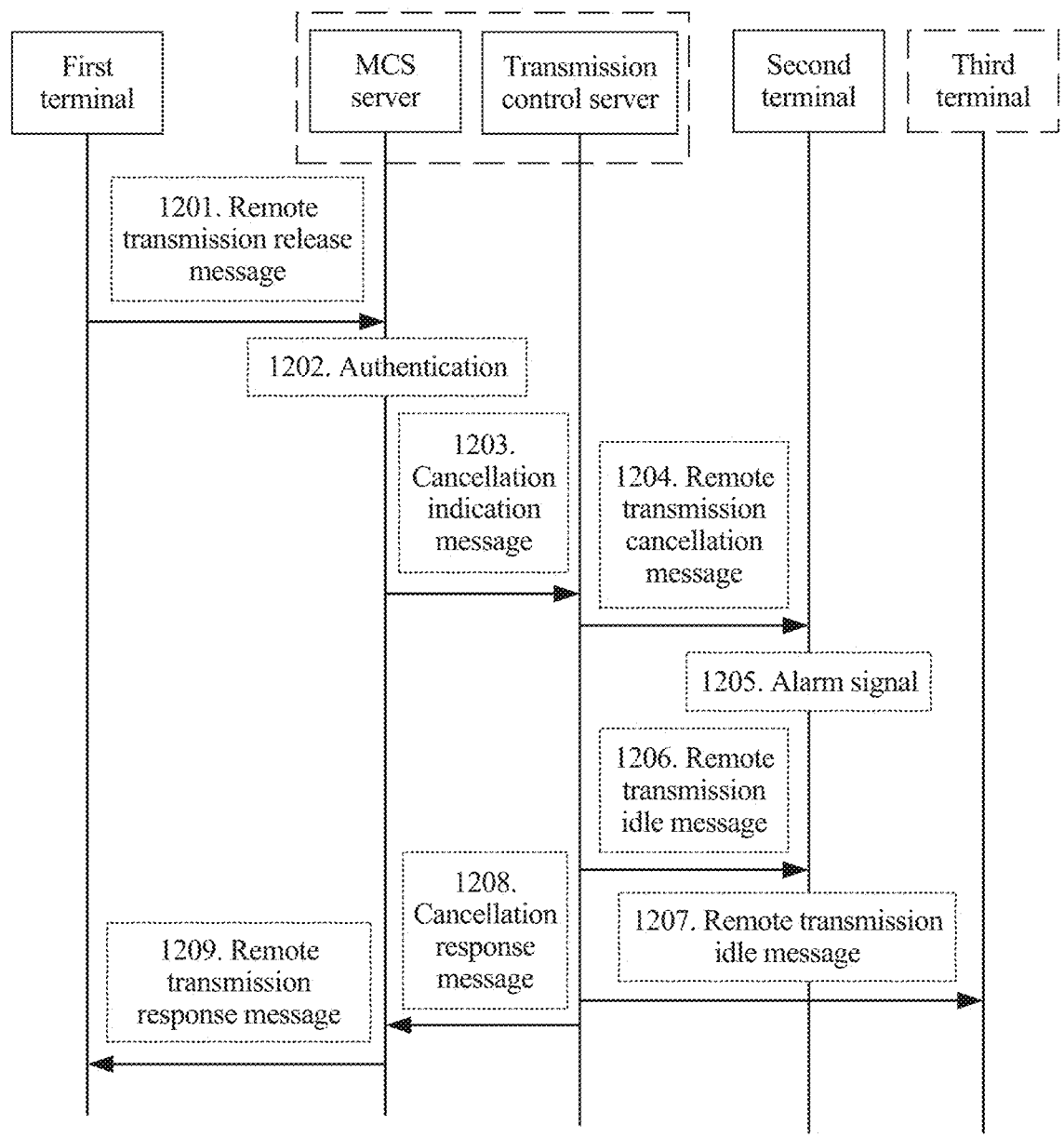
FIG. 12 is a schematic flowchart of a method for canceling media transmission permission according to an embodiment of this application.

FIG. 12 is a schematic flowchart of a method for canceling media transmission permission according to an embodiment of this application.

In a procedure shown in FIG. 12, a first terminal and a second terminal are located in different call sessions, and a target server is an MCS server.

Step 1201: The first terminal sends a remote transmission release message to the target server.

The remote transmission release message may further include information such as an identity of a first user and an identity of a second user.

Step 1202: The target server performs authentication on the first terminal and the second terminal. If the authentication succeeds, proceed to a next step; or if the authentication fails, end the entire procedure.

For specific content of the authentication performed by the target server, refer to the foregoing description. Details are not described herein again.

Step 1203: The target server needs to send a cancellation indication message to a transmission control server.

Step 1204: The transmission control server sends a remote transmission cancellation message to the second terminal.

Optionally, step 1205: The second terminal sends an alarm signal, to remind a user that media transmission permission of the second terminal is canceled, and that the second terminal is no longer allowed to transmit media data. For specific content of the alarm signal, refer to the foregoing description. Details are not described herein again.

Step 1206: The transmission control server sends a remote transmission idle message to the second terminal.

Step 1207: The transmission control server sends a remote transmission idle message to a third terminal that receives media data transmitted by the second terminal.

Step 1208: The transmission control server sends a cancellation response message to the target server.

Step 1209: The target server sends a remote transmission response message to the first terminal, and notifies, by using the remote transmission response message, the first terminal that the second terminal currently stops transmitting the media data to the third terminal.

An execution sequence of step 1206 to step 1208 is not limited. Details are not described herein.

Figure 13:
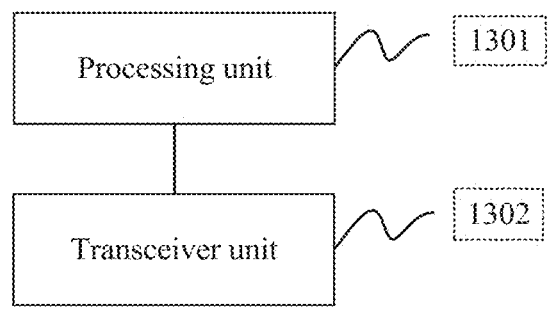
FIG. 13 is a schematic structural diagram of an apparatus for applying for media transmission permission according to an embodiment of this application.

FIG. 13 is a schematic structural diagram of an apparatus for applying for media transmission permission according to an embodiment of this application.

The apparatus may be configured to perform the method procedure in the foregoing embodiments.

Referring to FIG. 13, the apparatus includes: a processing unit 1301, configured to determine that a second terminal needs to transmit media data; and a transceiver unit 1302, configured to send media transmission permission request indication information to a mission critical service (MCS) server, where the media transmission permission request indication information is used to instruct the MCS server to grant media transmission permission to the second terminal.

Optionally, the media transmission permission request indication information is located in a first call request message.

The first call request message is used to instruct the MCS server to establish a first call session between the apparatus and the second terminal.

Optionally, after sending the media transmission permission request indication information to the mission critical service (MCS) server, the transceiver unit 1302 is further configured to: receive a first call response message that is sent by the MCS server and that includes a transmission taken message.

The transmission taken message is used to indicate that the media transmission permission is granted to the second terminal, and the first call response message is sent by the MCS server after the MCS server sends a second call request message to the second terminal based on the first call request message and receives a second call response message returned by the second terminal.

Optionally, after sending the media transmission permission request indication information to the mission critical service (MCS) server, the transceiver unit 1302 is further configured to: receive a transmission taken message sent by a transmission control server, where the transmission taken message is used to indicate that the media transmission permission is granted to the second terminal.

The transmission taken message is sent by the transmission control server after the transmission control server receives a media transmission permission request message sent by the MCS server based on the media transmission permission request indication information, and the media transmission permission request message is used to apply to the transmission control server for the media transmission permission for the second terminal.

Optionally, the media transmission permission request indication information is located in a remote private call request message.

The remote private call request message is used to instruct the MCS server to establish a second call session between the second terminal and a third terminal.

Figure 14:
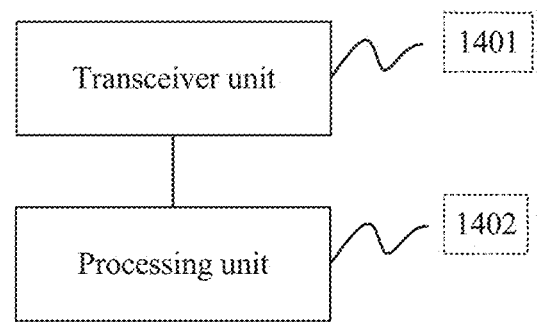
FIG. 14 is a schematic structural diagram of an apparatus for applying for media transmission permission according to an embodiment of this application.

FIG. 14 is a schematic structural diagram of an apparatus for applying for media transmission permission according to an embodiment of this application.

The apparatus may be configured to perform the method procedure in the foregoing embodiments.

Referring to FIG. 14, the apparatus includes: a transceiver unit 1401, configured to receive media transmission permission request indication information sent by a first terminal, where the media transmission permission request indication information is used to instruct the apparatus to grant media transmission permission to a second terminal; and a processing unit 1402, configured to grant the media transmission permission to the second terminal according to the media transmission permission request indication information.

Optionally, before granting the media transmission permission to the second terminal according to the media transmission permission request indication information, the processing unit 1402 is further configured to: determine that the first terminal has permission to apply for media transmission permission for terminals except the first terminal, and that the second terminal allows terminals except the second terminal to apply for the media transmission permission for the second terminal.

Optionally, the media transmission permission request indication information is located in a first call request message.

The first call request message is used to instruct the apparatus to establish a first call session between the first terminal and the second terminal.

Optionally, the processing unit 1402 is configured to: establish the first call session according to the first call request message; and after the first call session is established, grant, by using a transmission control server, the media transmission permission to the second terminal according to the media transmission permission request indication information.

Optionally, the processing unit 1402 is configured to: generate, based on the media transmission permission request indication information, a second call request message including a transmission granted message, where the transmission granted message is used to indicate that the second terminal obtains the media transmission permission, and the second call request message is used to invite the second terminal to participate in the first call session; and send the second call request message to the second terminal by using the transceiver unit 1401.

Optionally, after the media transmission permission is granted to the second terminal by sending the second call request message to the second terminal, the transceiver unit 1401 is further configured to: send a first call response message including a transmission taken message to the first terminal, where the first call response message is sent by the apparatus after the apparatus receives a second call response message returned by the second terminal.

The transmission taken message is used to indicate that the media transmission permission is granted to the second terminal.

Optionally, the first call session is a group call session.

The media transmission permission request message is further used to instruct the transmission control server to send a transmission taken message to a third terminal in the group call session, where the transmission taken message is used to indicate that the media transmission permission is granted to the second terminal.

Optionally, the first call session is a group call session, and the transceiver unit is further configured to: send a third call request message to a third terminal based on the first call request message; and the transceiver unit 1401 is further configured to: send a notification message including a transmission taken message to the third terminal, where the notification message is sent by the apparatus after the apparatus receives a third call response message returned by the third terminal.

Optionally, the media transmission permission request indication information is located in a remote private call request message.

The remote private call request message is used to instruct the apparatus to establish a second call session between the second terminal and a third terminal.

Figure 15:
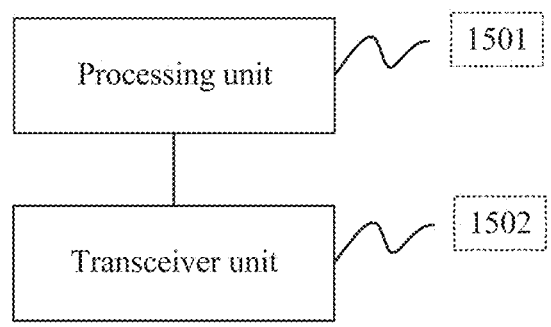
FIG. 15 is a schematic structural diagram of an apparatus for applying for media transmission permission according to an embodiment of this application.

FIG. 15 is a schematic structural diagram of an apparatus for applying for media transmission permission according to an embodiment of this application.

The apparatus may be configured to perform the method procedure in the foregoing embodiments.

Referring to FIG. 15, the apparatus includes: a processing unit 1501, configured to: after a call session between the apparatus and a second terminal is established, determine that the second terminal needs to transmit media data; and a transceiver unit 1502, configured to send a remote transmission request message to a target server, where the remote transmission request message is used to instruct the target server to grant media transmission permission to the second terminal, and the target server is a mission critical service (MCS) server or a transmission control server.

Optionally, after sending the remote transmission request message to the target server, the transceiver unit 1502 is further configured to: receive a transmission taken message sent by the target server.

The transmission taken message is used to indicate that the media transmission permission is granted to the second terminal.

Figure 16:
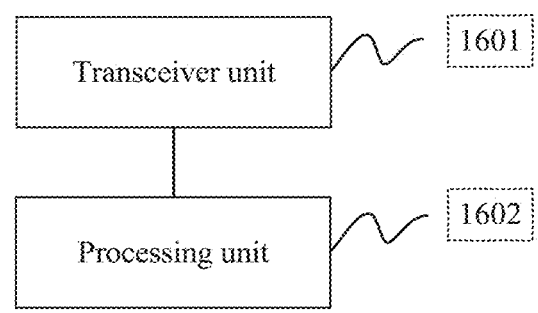
FIG. 16 is a schematic structural diagram of an apparatus for applying for media transmission permission according to an embodiment of this application.

FIG. 16 is a schematic structural diagram of an apparatus for applying for media transmission permission according to an embodiment of this application.

The apparatus may be configured to perform the method procedure in the foregoing embodiments.

Referring to FIG. 16, the apparatus includes: a transceiver unit 1601, configured to receive a remote transmission request message sent by a first terminal, where the remote transmission request message is used to instruct the target server to grant media transmission permission to a second terminal, the remote transmission request message is sent after a call session between the first terminal and the second terminal is established, and the target server is a mission critical service (MCS) server or a transmission control server; and a processing unit 1602, configured to grant the media transmission permission to the second terminal.

Optionally, before granting the media transmission permission to the second terminal, the processing unit 1602 is further configured to: determine that the first terminal has permission to apply for media transmission permission for terminals except the first terminal, and that the second terminal allows terminals except the second terminal to apply for the media transmission permission for the second terminal.

Optionally, before granting the media transmission permission to the second terminal, the processing unit 1602 is further configured to: if it is determined that a third terminal is taking the media transmission permission, cancel the media transmission permission taken by the third terminal.

Figure 17:
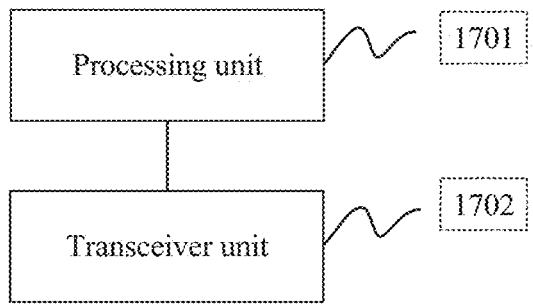
FIG. 17 is a schematic structural diagram of an apparatus for canceling media transmission permission according to an embodiment of this application.

FIG. 17 is a schematic structural diagram of an apparatus for canceling media transmission permission according to an embodiment of this application.

The apparatus may be configured to perform the method procedure in the foregoing embodiments.

Referring to FIG. 17, the apparatus includes: a processing unit 1701, configured to determine that a second terminal is taking media transmission permission to transmit media data; and a transceiver unit 1702, configured to send a remote transmission release message to a target server, where the remote transmission release message is used to instruct the target server to cancel the media transmission permission of the second terminal, and the target server is a mission critical service (MCS) server or a transmission control server.

Optionally, after sending the remote transmission release message to the target server, the transceiver unit 1702 is further configured to: receive a remote transmission idle message returned by the target server, where the remote transmission idle message is used to indicate that the media transmission permission of the second terminal is canceled.

Figure 18:
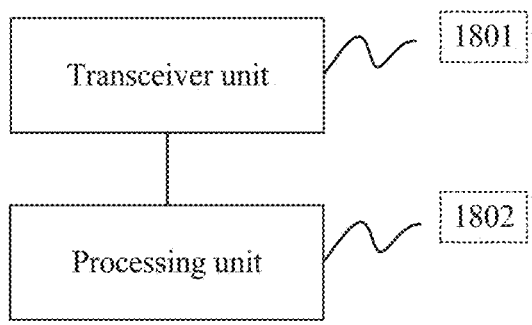
FIG. 18 is a schematic structural diagram of an apparatus for canceling media transmission permission according to an embodiment of this application.

FIG. 18 is a schematic structural diagram of an apparatus for canceling media transmission permission according to an embodiment of this application.

The apparatus may be configured to perform the method procedure in the foregoing embodiments.

Referring to FIG. 18, the apparatus includes: a transceiver unit 1801, configured to receive a remote transmission release message sent by a first terminal, where the remote transmission release message is used to instruct the target server to cancel media transmission permission of a second terminal, and the target server is a mission critical service (MCS) server or a transmission control server; and a processing unit 1802, configured to cancel the media transmission permission of the second terminal according to the remote transmission release message.

Optionally, before canceling the media transmission permission of the second terminal, the processing unit 1802 is further configured to: determine that the first terminal has permission to cancel media transmission permission of terminals except the first terminal, and that the second terminal allows terminals except the second terminal to cancel the media transmission permission of the second terminal.

Optionally, after the media transmission permission of the second terminal is canceled, the transceiver unit 1801 is further configured to: send a remote transmission idle message to the first terminal, where the remote transmission idle message is used to indicate that the media transmission permission of the second terminal is canceled.

Optionally, a call session in which the second terminal is located is a group call session.

After the media transmission permission of the second terminal is canceled, the transceiver unit 1801 is further configured to: send a remote transmission idle message to a third terminal, where the remote transmission idle message is used to indicate that the media transmission permission of the second terminal is canceled, and the third terminal is any terminal in the group call session.

Figure 19:
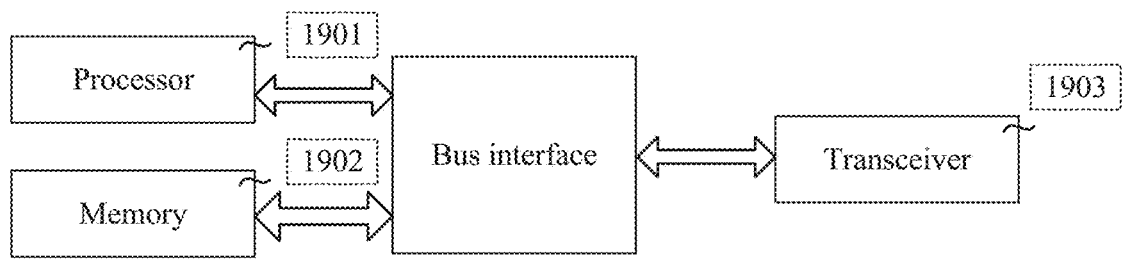
FIG. 19 is a schematic structural diagram of an apparatus for applying for media transmission permission according to an embodiment of this application.

FIG. 19 is a schematic structural diagram of an apparatus for applying for media transmission permission according to an embodiment of this application.

The apparatus may be configured to perform the method procedure in the foregoing embodiments.

Referring to FIG. 19, the apparatus includes a processor 1901, a memory 1902, and a transceiver 1903.

The memory 1902 is configured to store a computer instruction.

The processor 1901 is configured to determine that a second terminal needs to transmit media data.

The transceiver 1903 is configured to send media transmission permission request indication information to a mission critical service (MCS) server, where the media transmission permission request indication information is used to instruct the MCS server to grant media transmission permission to the second terminal.

Optionally, the media transmission permission request indication information is located in a first call request message.

The first call request message is used to instruct the MCS server to establish a first call session between the apparatus and the second terminal.

Optionally, after sending the media transmission permission request indication information to the mission critical service (MCS) server, the transceiver 1903 is further configured to: receive a first call response message that is sent by the MCS server and that includes a transmission taken message.

The transmission taken message is used to indicate that the media transmission permission is granted to the second terminal, and the first call response message is sent by the MCS server after the MCS server sends a second call request message to the second terminal based on the first call request message and receives a second call response message returned by the second terminal.

Optionally, after sending the media transmission permission request indication information to the mission critical service (MCS) server, the transceiver 1903 is further configured to: receive a transmission taken message sent by a transmission control server, where the transmission taken message is used to indicate that the media transmission permission is granted to the second terminal.

The transmission taken message is sent by the transmission control server after the transmission control server receives a media transmission permission request message sent by the MCS server based on the media transmission permission request indication information, and the media transmission permission request message is used to apply to the transmission control server for the media transmission permission for the second terminal.

Optionally, the media transmission permission request indication information is located in a remote private call request message.

The remote private call request message is used to instruct the MCS server to establish a second call session between the second terminal and a third terminal.

A bus interface may be further included in FIG. 19. The bus interface may include any quantity of interconnected buses and bridges. Various circuits of one or more processors represented by the processor and of memories represented by the memory are linked together. The bus interface may further link together various other circuits such as a peripheral device, a voltage regulator, and a power management circuit. This is well known in the art, and therefore is not further described in this specification.

Figure 20:
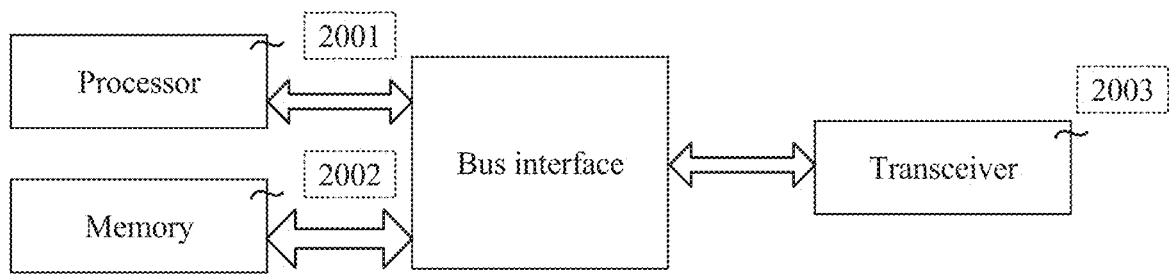
FIG. 20 is a schematic structural diagram of an apparatus for applying for media transmission permission according to an embodiment of this application.

FIG. 20 is a schematic structural diagram of an apparatus for applying for media transmission permission according to an embodiment of this application.

The apparatus may be configured to perform the method procedure in the foregoing embodiments.

Referring to FIG. 20, the apparatus includes a processor 2001, a memory 2002, and a transceiver 2003.

The memory 2002 is configured to store a computer instruction.

The transceiver 2003 is configured to receive media transmission permission request indication information sent by a first terminal, where the media transmission permission request indication information is used to instruct the apparatus to grant media transmission permission to a second terminal.

The processor 2001 is configured to grant the media transmission permission to the second terminal according to the media transmission permission request indication information.

Optionally, before granting the media transmission permission to the second terminal according to the media transmission permission request indication information, the processor 2001 is further configured to: determine that the first terminal has permission to apply for media transmission permission for terminals except the first terminal, and that the second terminal allows terminals except the second terminal to apply for the media transmission permission for the second terminal.

Optionally, the media transmission permission request indication information is located in a first call request message.

The first call request message is used to instruct the apparatus to establish a first call session between the first terminal and the second terminal.

Optionally, the processor 2001 is configured to: establish the first call session according to the first call request message; and after the first call session is established, grant, by using a transmission control server, the media transmission permission to the second terminal according to the media transmission permission request indication information.

Optionally, the processor 2001 is configured to: generate, based on the media transmission permission request indication information, a second call request message including a transmission granted message, where the transmission granted message is used to indicate that the second terminal obtains the media transmission permission, and the second call request message is used to invite the second terminal to participate in the first call session; and send the second call request message to the second terminal by using the transceiver 2003.

Optionally, after the media transmission permission is granted to the second terminal by sending the second call request message to the second terminal, the transceiver 2003 is further configured to: send a first call response message including a transmission taken message to the first terminal, where the first call response message is sent by the apparatus after the apparatus receives a second call response message returned by the second terminal.

The transmission taken message is used to indicate that the media transmission permission is granted to the second terminal.

Optionally, the first call session is a group call session.

The media transmission permission request message is further used to instruct the transmission control server to send a transmission taken message to a third terminal in the group call session, where the transmission taken message is used to indicate that the media transmission permission is granted to the second terminal.

Optionally, the first call session is a group call session, and the transceiver 2003 is further configured to: send a third call request message to a third terminal based on the first call request message, where the third call request message is used to invite the third terminal to participate in the group call session; and send a notification message including a transmission taken message to the third terminal, where the notification message is sent by the apparatus after the apparatus receives a third call response message returned by the third terminal.

Optionally, the media transmission permission request indication information is located in a remote private call request message.

The remote private call request message is used to instruct the apparatus to establish a second call session between the second terminal and a third terminal.

A bus interface may be further included in FIG. 20. The bus interface may include any quantity of interconnected buses and bridges. Various circuits of one or more processors represented by the processor and of memories represented by the memory are linked together. The bus interface may further link together various other circuits such as a peripheral device, a voltage regulator, and a power management circuit. This is well known in the art, and therefore is not further described in this specification.

Figure 21:
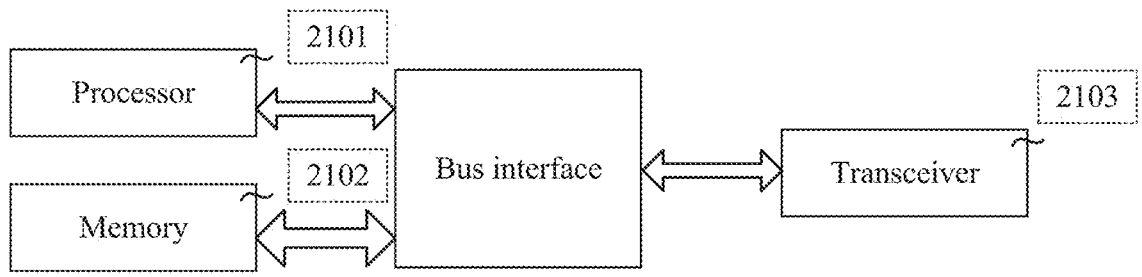
FIG. 21 is a schematic structural diagram of an apparatus for applying for media transmission permission according to an embodiment of this application.

FIG. 21 is a schematic structural diagram of an apparatus for applying for media transmission permission according to an embodiment of this application.

The apparatus may be configured to perform the method procedure in the foregoing embodiments.

Referring to FIG. 21, the apparatus includes a processor 2101, a memory 2102, and a transceiver 2103.

The memory 2102 is configured to store a computer instruction.

The processor 2101 is configured to: after a call session between the apparatus and a second terminal is established, determine that the second terminal needs to transmit media data.

The transceiver 2103 is configured to send a remote transmission request message to a target server, where the remote transmission request message is used to instruct the target server to grant media transmission permission to the second terminal, and the target server is a mission critical service (MCS) server or a transmission control server.

Optionally, after sending the remote transmission request message to the target server, the transceiver 2103 is further configured to: receive a transmission taken message sent by the target server.

The transmission taken message is used to indicate that the media transmission permission is granted to the second terminal.

A bus interface may be further included in FIG. 21. The bus interface may include any quantity of interconnected buses and bridges. Various circuits of one or more processors represented by the processor and of memories represented by the memory are linked together. The bus interface may further link together various other circuits such as a peripheral device, a voltage regulator, and a power management circuit. This is well known in the art, and therefore is not further described in this specification.

Figure 22:
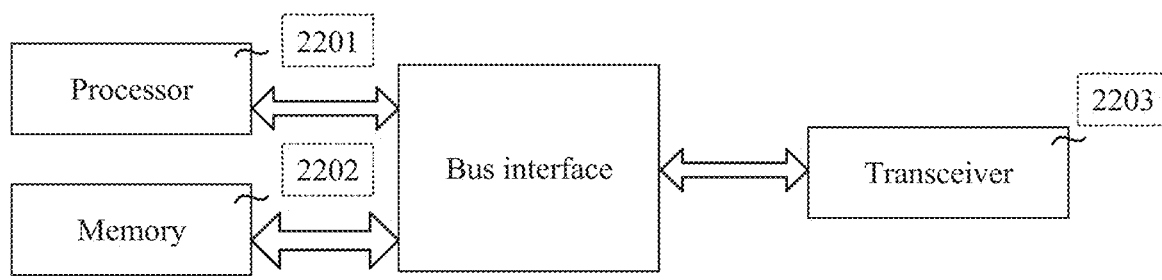
FIG. 22 is a schematic structural diagram of an apparatus for applying for media transmission permission according to an embodiment of this application.

FIG. 22 is a schematic structural diagram of an apparatus for applying for media transmission permission according to an embodiment of this application.

The apparatus may be configured to perform the method procedure in the foregoing embodiments.

Referring to FIG. 22, the apparatus includes a processor 2201, a memory 2202, and a transceiver 2203.

The memory 2202 is configured to store a computer instruction.

The transceiver 2203 is configured to receive a remote transmission request message sent by a first terminal, where the remote transmission request message is used to instruct the target server to grant media transmission permission to a second terminal, the remote transmission request message is sent after a call session between the first terminal and the second terminal is established, and the target server is a mission critical service (MCS) server or a transmission control server.

The processor 2201 is configured to grant the media transmission permission to the second terminal.

Optionally, before granting the media transmission permission to the second terminal, the processor 2201 is further configured to: determine that the first terminal has permission to apply for media transmission permission for terminals except the first terminal, and that the second terminal allows terminals except the second terminal to apply for the media transmission permission for the second terminal.

Optionally, before granting the media transmission permission to the second terminal, the processor 2201 is further configured to: if it is determined that a third terminal is taking the media transmission permission, cancel the media transmission permission taken by the third terminal.

A bus interface may be further included in FIG. 22. The bus interface may include any quantity of interconnected buses and bridges. Various circuits of one or more processors represented by the processor and of memories represented by the memory are linked together. The bus interface may further link together various other circuits such as a peripheral device, a voltage regulator, and a power management circuit. This is well known in the art, and therefore is not further described in this specification.

Figure 23:
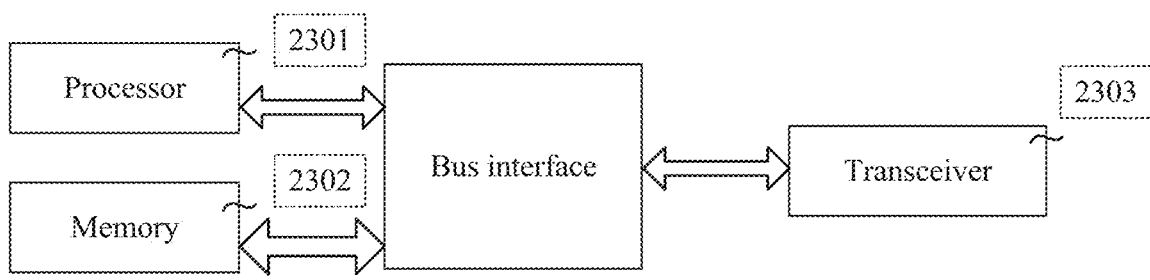
FIG. 23 is a schematic structural diagram of an apparatus for canceling media transmission permission according to an embodiment of this application.

FIG. 23 is a schematic structural diagram of an apparatus for canceling media transmission permission according to an embodiment of this application.

The apparatus may be configured to perform the method procedure in the foregoing embodiments.

Referring to FIG. 23, the apparatus includes a processor 2301, a memory 2302, and a transceiver 2303.

The memory 2302 is configured to store a computer instruction.

The processor 2301 is configured to determine that a second terminal is taking media transmission permission to transmit media data.

The transceiver 2303 is configured to send a remote transmission release message to a target server, where the remote transmission release message is used to instruct the target server to cancel the media transmission permission of the second terminal, and the target server is a mission critical service (MCS) server or a transmission control server.

Optionally, after sending the remote transmission release message to the target server, the transceiver 2303 is further configured to: receive a remote transmission idle message returned by the target server, where the remote transmission idle message is used to indicate that the media transmission permission of the second terminal is canceled.

A bus interface may be further included in FIG. 23. The bus interface may include any quantity of interconnected buses and bridges. Various circuits of one or more processors represented by the processor and of memories represented by the memory are linked together. The bus interface may further link together various other circuits such as a peripheral device, a voltage regulator, and a power management circuit. This is well known in the art, and therefore is not further described in this specification.

Figure 24:
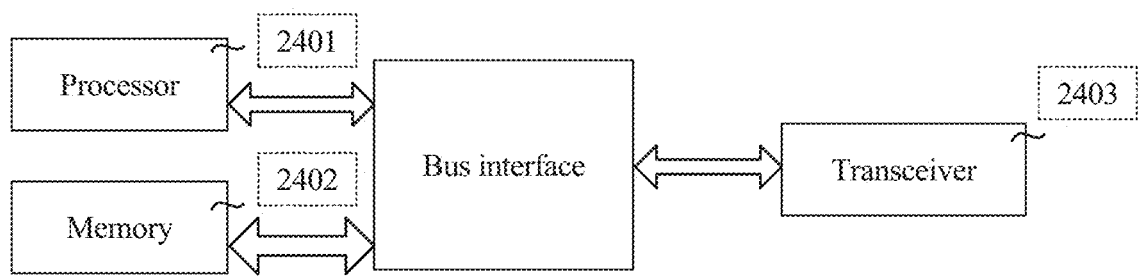
FIG. 24 is a schematic structural diagram of an apparatus for canceling media transmission permission according to an embodiment of this application.

FIG. 24 is a schematic structural diagram of an apparatus for canceling media transmission permission according to an embodiment of this application.

The apparatus may be configured to perform the method procedure in the foregoing embodiments.

Referring to FIG. 24, the apparatus includes a processor 2401, a memory 2402, and a transceiver 2403.

The memory 2402 is configured to store a computer instruction.

The transceiver 2403 is configured to receive a remote transmission release message sent by a first terminal, where the remote transmission release message is used to instruct the target server to cancel media transmission permission of a second terminal, and the target server is a mission critical service (MCS) server or a transmission control server.

The processor 2401 is configured to cancel the media transmission permission of the second terminal according to the remote transmission release message.

Optionally, before canceling the media transmission permission of the second terminal, the processor 2401 is further configured to: determine that the first terminal has permission to cancel media transmission permission of terminals except the first terminal, and that the second terminal allows terminals except the second terminal to cancel the media transmission permission of the second terminal.

Optionally, after the media transmission permission of the second terminal is canceled, the transceiver 2403 is further configured to: send a remote transmission idle message to the first terminal, where the remote transmission idle message is used to indicate that the media transmission permission of the second terminal is canceled.

Optionally, a call session in which the second terminal is located is a group call session.

After the media transmission permission of the second terminal is canceled, the transceiver 2403 is further configured to: send a remote transmission idle message to a third terminal, where the remote transmission idle message is used to indicate that the media transmission permission of the second terminal is canceled, and the third terminal is any terminal in the group call session.

A bus interface may be further included in FIG. 24. The bus interface may include any quantity of interconnected buses and bridges. Various circuits of one or more processors represented by the processor and of memories represented by the memory are linked together. The bus interface may further link together various other circuits such as a peripheral device, a voltage regulator, and a power management circuit. This is well known in the art, and therefore is not further described in this specification.

It should be noted that, in the embodiments of this application, the transceiver may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The memory may include a volatile memory, for example, a random-access memory (RAM); or the memory may include a nonvolatile memory, for example, a read-only memory (ROM), a flash memory, a hard disk drive (HDD), or a solid-state drive (SSD); or the memory may include a combination of the foregoing types of memories.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory and an optical memory) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine instruction, so that the instructions executed by a computer or a processor of another programmable data processing device generate an apparatus for implementing a specific function in one or more processes in the flowcharts and/or in one or more blocks in the block diagrams.

These computer program instructions may be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, comprising:
sending, by a mission critical service (MCS) server based on media transmission permission request indication information, a media transmission permission request message to a transmission control server, wherein the media transmission permission request indication information instructs to grant media transmission permission to a second terminal; and
sending, by the transmission control server, a media transmission permission response message to the MCS server, wherein the media transmission permission response message indicates that the media transmission permission is granted to the second terminal.

2. The method according to claim 1, further comprising:
sending, by the transmission control server, a transmission granted message to the second terminal.

3. The method according to claim 2, further comprising:
receiving, by the MCS server, the media transmission permission request indication information from a first terminal.

4. The method according to claim 3, further comprising:
in response to the transmission control server determining that media transmission permission is taken by a third terminal, sending, by the transmission control server, a remote transmission cancellation message to the third terminal, wherein the remote transmission cancellation message cancels the media transmission permission used by the third terminal.

5. The method according to claim 4, further comprising:
in response to the transmission control server determining that media transmission permission is taken by a third terminal, sending, by the transmission control server, a remote transmission cancellation message to the third terminal, wherein the remote transmission cancellation message cancels the media transmission permission used by the third terminal.

6. The method according to claim 5, further comprising:
sending, by the transmission control server, a transmission taken message to the third terminal, wherein the transmission taken message indicates that the media transmission permission is granted to the second terminal.

7. The method according to claim 1, further comprising:
receiving, by the MCS server, the media transmission permission request indication information from a first terminal.

8. The method according to claim 1, further comprising:
in response to the transmission control server determining that media transmission permission is taken by a third terminal, sending, by the transmission control server, a remote transmission cancellation message to the third terminal, wherein the remote transmission cancellation message cancels the media transmission permission used by the third terminal.

9. The method according to claim 8, further comprising:
sending, by the transmission control server, a transmission taken message to the third terminal, wherein the transmission taken message indicates that the media transmission permission is granted to the second terminal.

10. A system, comprising:
a mission critical service (MCS) server; and
a transmission control server;
wherein:
the MCS server is configured to send, based on media transmission permission request indication information, a media transmission permission request message to the transmission control server, wherein the media transmission permission request indication information instructs to grant media transmission permission to a second terminal; and
the transmission control server is configured to send a media transmission permission response message to the MCS server, wherein the media transmission permission response message indicates that the media transmission permission is granted to the second terminal.

11. The system according to claim 10, wherein the transmission control server is further configured to send a transmission granted message to the second terminal.

12. The system according to claim 10, wherein the MCS server is further configured to receive the media transmission permission request indication information from a first terminal.

13. The system according to claim 10, wherein the transmission control server is further configured to:
in response to the transmission control server determining that media transmission permission is taken by a third terminal, send a remote transmission cancellation message to the third terminal, wherein the remote transmission cancellation message cancels the media transmission permission used by the third terminal.

14. The system according to claim 13, wherein:
the transmission control server is further configured to send a transmission taken message to the third terminal, wherein the transmission taken message indicates that the media transmission permission is granted to the second terminal.

15. A system, comprising:
a first non-transitory computer readable storage medium storing a first program that is executable by one or more first processors; and a second non-transitory computer readable storage medium storing a second program that is executable by one or more second processors;

wherein the first program includes instructions for:
sending, based on indication information, a first message to a first server, wherein the indication information instructs to grant media transmission permission to a second terminal; and wherein the second program includes instructions for:
sending a second message to a second server, wherein the second message indicates that the media transmission permission is granted to the second terminal.

16. The system according to claim 15, wherein the second program further includes instructions for sending a third message to the second terminal, and the third message indicates that media transmission permission is granted.

17. The system according to claim 15, wherein the second server is configured to receive the indication information from a first terminal.

18. The system according to claim 15, wherein the second program further includes instructions for:
in response to determining that media transmission permission is taken by a third terminal, sending a fourth message to the third terminal, wherein the fourth message cancels the media transmission permission used by the third terminal.

19. The system according to claim 18, wherein the second program further includes instructions for:
sending a fifth message to the third terminal, wherein the fourth message indicates that media transmission permission is granted to the second terminal.

\* \* \* \* \*